(12) United States Patent
Szmuk et al.

(10) Patent No.: US 11,643,219 B1
(45) Date of Patent: May 9, 2023

(54) RECONFIGURABLE PROPULSION MECHANISMS OF A MULTIROTOR AERIAL VEHICLE

(71) Applicant: Amazon Technologies, Inc., Seattle, WA (US)

(72) Inventors: Michael Szmuk, Seattle, WA (US); Marco Antonio De Barros Ceze, Seattle, WA (US); Max Maria Jacques Opgenoord, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 313 days.

(21) Appl. No.: 16/914,973

(22) Filed: Jun. 29, 2020

(51) Int. Cl.
| | |
|---|---|
| *B64D 31/10* | (2006.01) |
| *B64C 39/02* | (2006.01) |
| *B64C 29/02* | (2006.01) |
| *B64C 39/06* | (2006.01) |

(52) U.S. Cl.
CPC .............. *B64D 31/10* (2013.01); *B64C 29/02* (2013.01); *B64C 39/024* (2013.01); *B64C 39/062* (2013.01); *B64C 2201/027* (2013.01); *B64C 2201/108* (2013.01); *B64C 2201/141* (2013.01)

(58) Field of Classification Search
CPC .......... B64D 31/10; B64C 11/46; B64C 29/02
See application file for complete search history.

(56) References Cited

U.S. PATENT DOCUMENTS

| | | | | |
|---|---|---|---|---|
| 11,136,118 B2 * | 10/2021 | Fischer | ................ | G05D 1/101 |
| 11,136,119 B2 * | 10/2021 | LeGrand | ............... | B64C 39/062 |
| 11,249,477 B2 * | 2/2022 | LeGrand | ................ | B64C 11/46 |
| 11,394,335 B1 * | 7/2022 | Szmuk | ................ | B64C 29/0025 |
| 2016/0311528 A1 * | 10/2016 | Nemovi | ................ | B64C 27/52 |
| 2017/0158342 A1 * | 6/2017 | Ishii | .................... | G05D 1/0072 |
| 2018/0002027 A1 * | 1/2018 | McCullough | ........... | B64C 29/02 |
| 2019/0256191 A1 * | 8/2019 | Suzuki | .................... | B64C 27/08 |
| 2020/0172257 A1 * | 6/2020 | Bhat | .................... | B64C 39/024 |
| 2020/0324908 A1 * | 10/2020 | Wortmann | ............ | B60L 3/0092 |
| 2021/0339881 A1 * | 11/2021 | Bevirt | .................... | B60L 58/18 |
| 2022/0177123 A1 * | 6/2022 | Hashimoto | ............ | B64D 27/24 |

* cited by examiner

*Primary Examiner* — Richard Green
*Assistant Examiner* — Arfan Y. Sinaki
(74) *Attorney, Agent, or Firm* — Athorus, PLLC

(57) ABSTRACT

This disclosure describes example reconfigurable propulsion mechanisms, example multi-rotor aerial vehicle apparatuses, and methods that may be used to alter the yaw torque polarity produced by one or more propulsion mechanisms in response to a detected loss of thrust produced by another propulsion mechanism of the aerial vehicle. For example, each reconfigurable propulsion mechanism may be configured to move between a normal operating position and a reconfigured operating position. When a reconfigurable propulsion mechanism is in a normal operating position, the yaw torque has a first polarity, such as clockwise. In comparison, when the same reconfigurable propulsion mechanism is in the reconfigured operating position, the yaw torque polarity produced by the propulsion mechanism is reversed and has a second polarity, such as counter-clockwise. Reconfiguration may be done to recover an aerial vehicle from a degraded operational state, for example resulting from a motor-out event, to a non-degraded operational state.

20 Claims, 22 Drawing Sheets

LOSS OF THRUST DETECTION MECHANISM
("LTDM") - POSITION 1
803-1

LOSS OF THRUST DETECTION MECHANISM
("LTDM") - POSITION 2
803-2

RELEASE MECHANISM
("RM") - DISENGAGED POSITION
901-1

RELEASE MECHANISM
("RM") ENGAGED POSITION
901-2

RECONFIGURABLE PROPULSION MECHANISMS OF A MULTIROTOR AERIAL VEHICLE

BACKGROUND

Unmanned vehicles, such as unmanned aerial vehicles ("UAV"), ground and water based automated vehicles, are continuing to increase in use. For example, UAVs are often used by hobbyists to obtain aerial images of buildings, landscapes, etc. Likewise, unmanned ground-based units are often used in materials handling facilities to autonomously transport inventory within the facility. While there are many beneficial uses of these vehicles, balancing the tightly coupled vehicle performance parameters of stability, maneuverability, and energy efficiency introduces design complexities. For example, due to current design limitations, design tradeoffs exist between optimizing UAVs for high agility versus high energy efficiency. Likewise, aerial vehicles are typically designed to only operate with four degrees of freedom—pitch, yaw, roll, and heave. In addition, aerial vehicles are generally designed assuming a fully operational state. Accordingly, there is a need for systems and methods to maintain control and safety of aerial vehicles even in degraded operational states and/or to selectively increase the agility and/or maneuverability of the aerial vehicle.

DETAILED DESCRIPTION

Figure 1:
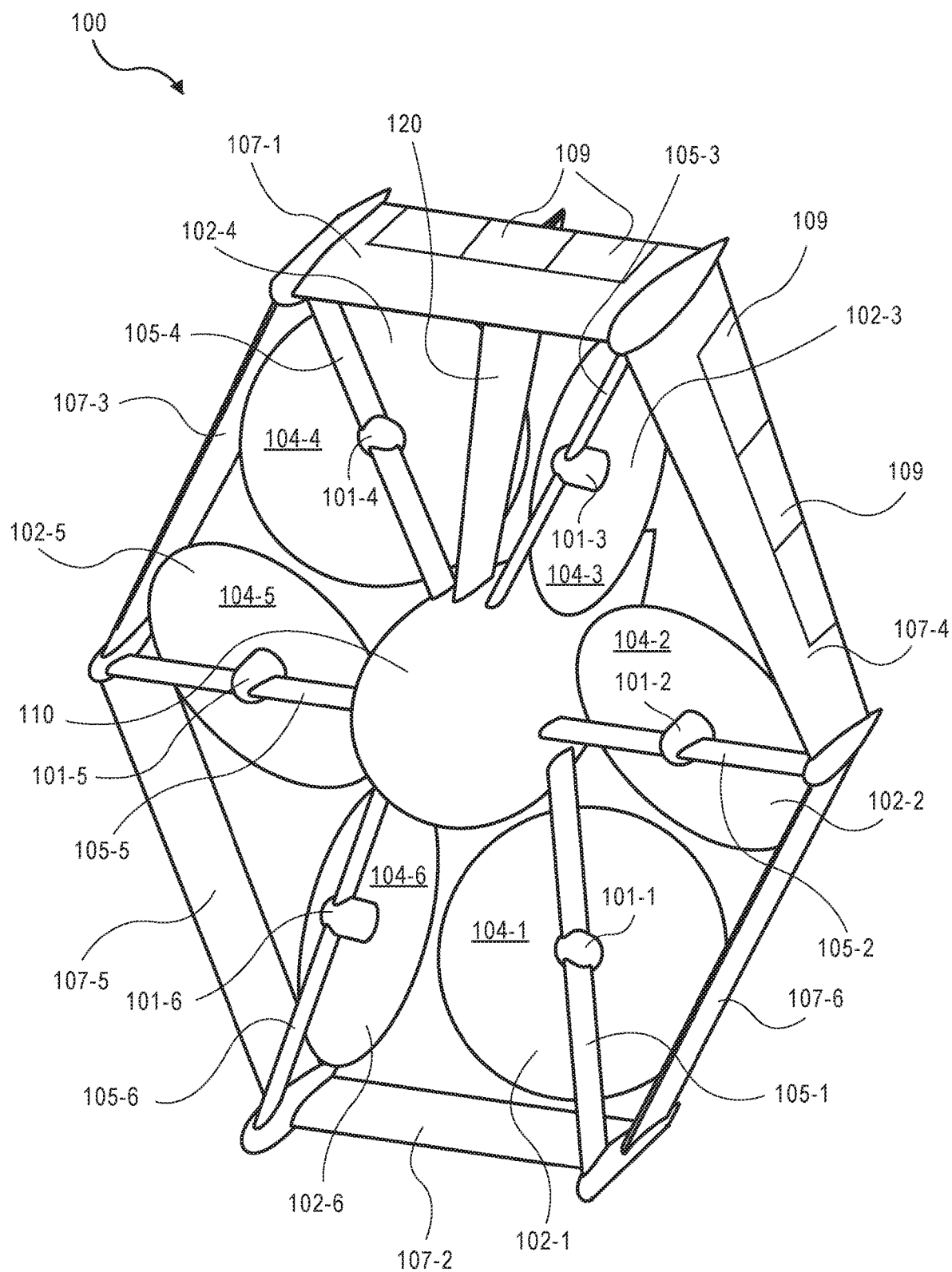
FIGS. 1-4 illustrate various views of an aerial vehicle with a substantially hexagonal shaped ring wing, in accordance with disclosed implementations.

This disclosure describes example reconfigurable propulsion mechanisms, example multi-rotor aerial vehicle apparatuses, and methods that may be used to alter the yaw torque polarity (due to thrust) produced by one or more propulsion mechanisms in response to a detected loss of thrust produced by another propulsion mechanism of the aerial vehicle. For example, each reconfigurable propulsion mechanism of an aerial vehicle may be configured to move between a normal operating position and a reconfigured operating position. When a reconfigurable propulsion mechanism is in a normal operating position, the yaw torque has a first polarity, such as clockwise. In comparison, when the same reconfigurable propulsion mechanism is in the reconfigured operating position, the yaw torque polarity produced by the propulsion mechanism is reversed and has a second polarity, such as counter-clockwise. As discussed further below, reversing the polarity of the yaw torque polarity may be done without reversing the spin direction of the propulsion mechanism.

The disclosed implementations may be particularly useful in multi-rotor aerial vehicles, such as hex-rotor aerial vehicles, octo-rotor aerial vehicles, etc. As is known, propulsion mechanisms of multi-rotor aerial vehicles, such as quad-rotor, hex-rotor, octo-rotor aerial vehicles are typically positioned so that adjacent propulsion mechanisms produce alternating yaw torque polarities, thereby canceling out the overall yaw torque forces produced by the propulsion mechanisms of the vehicle and enabling four or more degrees of operational freedom. An aerial vehicle that is operating as expected with four or more degrees of freedom is generally referred to as an aerial vehicle that is operating in a non-degraded manner, or a non-degraded aerial vehicle.

If a propulsion mechanism of a non-degraded aerial vehicle fails (e.g., the propeller is damaged, etc.), the alternating yaw torque polarities of the propulsion mechanisms of the aerial vehicle are disrupted and the vehicle loses degrees of operational freedom due to a coupling between a horizontal torque (e.g., pitch) and a vertical torque (e.g., yaw). An aerial vehicle that is operating with less than four degrees of freedom is generally referred to herein as an aerial vehicle that is operating in a degraded manner, or a degraded aerial vehicle. As discussed further below, with the herein described example reconfigurable propulsion mechanisms, one or more remaining propulsion mechanisms may move from a normal operating position to a reconfigured operating position, thereby reversing the yaw torque polarity of the propulsion mechanism and restoring the alternating yaw torque polarity of adjacent propulsion mechanisms of the aerial vehicle.

For example, if a first propulsion mechanism of a hex-rotor aerial vehicle becomes inoperable, in accordance with the disclosed implementations, the opposing propulsion mechanism of the aerial vehicle may be shut down and two adjacent propulsion mechanisms between the first propulsion mechanism and the opposing propulsion mechanism moved from the normal operating position to the reconfigured operating position, thereby reversing the yaw torque polarities of those propulsion mechanisms. The resulting configuration of the aerial vehicle will effectively be that of a quad-rotor aerial vehicle, with each propulsion mechanism producing alternating yaw torque polarities.

As discussed further below, implementations of a reconfigurable propulsion mechanism may include a loss of thrust detection mechanism ("LTDM") and a reconfiguration mechanism ("RM"). The RM may be fixedly mounted to the frame of the aerial vehicle and the LTDM, which houses the propulsion mechanism, such as a motor and propeller, of the reconfigurable propulsion mechanism, is pivotably coupled to the RM so that the LTDM can move between the normal operating position and the reconfigured operating position, as discussed further below. In some implementations, each reconfigurable propulsion mechanism of an aerial vehicle may be connected such that a loss of thrust from one of the propulsion mechanisms will result in one or more of the other propulsion mechanisms of the aerial vehicle moving from a normal operating position to a reconfigured operating position. The connection may be mechanical, electrical, electromechanical, direct, indirect (e.g., through a flight controller), or via other means.

FIG. 1 illustrates a view of an aerial vehicle 100 with a ring wing that is substantially hexagonal in shape and that surrounds a plurality of propulsion mechanisms, according to disclosed implementations. The aerial vehicle 100 includes six propulsion mechanisms 102-1, 102-2, 102-3, 102-4, 102-5, and 102-6 spaced about the fuselage 110 of the aerial vehicle 100. As illustrated, the propulsion mechanisms 102 include motors 101-1, 101-2, 101-3, 101-4, 101-5, and 101-6 and propellers 104-1, 104-2, 104-3, 104-4, 104-5, and 104-6. Likewise, some or all of the propulsion mechanisms may be reconfigurable propulsion mechanisms, in accordance with the disclosed implementations.

In the implementation illustrated in FIG. 1, the aerial vehicle 100 also includes a ring wing 107 having a substantially hexagonal shape that extends around and forms the perimeter of the aerial vehicle 100. In the illustrated example, the ring wing has six sections or segments 107-1, 107-2, 107-3, 107-4, 107-5, and 107-6 that are joined at adjacent ends to form the ring wing 107 around the aerial vehicle 100. Each segment of the ring wing 107 has an airfoil shape to produce lift when the aerial vehicle is oriented as illustrated in FIG. 1 and moving in a direction that is substantially horizontal. As illustrated, the ring wing is positioned at an angle with respect to the fuselage 110 such that the lower segment 107-2 of the ring wing acts as a front wing as it is toward the front of the aerial vehicle when oriented as shown and moving in a horizontal direction. The upper segment 107-1 of the ring wing, which has a longer chord length than the lower segment 107-2 of the ring wing 107, is farther back and thus acts as a rear wing.

The ring wing 107 is secured to the fuselage 110 by motor arms 105. In this example, all six motor arms 105-1, 105-2, 105-3, 105-4, 105-5, and 105-6 are coupled to the fuselage at one end, extend from the fuselage 110 and couple to the ring wing 107 at a second end, thereby securing the ring wing 107 to the fuselage 110. In other implementations, less than all of the motor arms may extend from the fuselage 110 and couple to the ring wing 107. For example, motor arms 105-2 and 105-5 may be coupled to the fuselage 110 at one end and extend outward from the fuselage but not couple to the ring wing 107.

In some implementations, the aerial vehicle may also include one or more stabilizer fins 120 that extend from the fuselage 110 to the ring wing 107. The stabilizer fin 120 may also have an airfoil shape. In the illustrated example, the stabilizer fin 120 extends vertically from the fuselage 110 to the ring wing 107. In other implementations, the stabilizer fin may be at other positions. For example, the stabilizer fin may extend downward from the fuselage between motor arm 105-1 and motor arm 105-6.

In general, one or more stabilizer fins may extend from the fuselage 110, between any two motor arms 105 and couple to an interior of the ring wing 107. For example, stabilizer fin 120 may extend upward between motor arms 105-3 and 105-4, a second stabilizer fin may extend from the fuselage and between motor arms 105-5 and 105-6, and a third stabilizer fin may extend from the fuselage and between motor arms 105-1 and 105-2.

Likewise, while the illustrated example shows the motor arm extending from the fuselage 110 at one end and coupling to the interior of the ring wing 107 at a second end, in other implementations, one or more of the stabilizer fin(s) may extend from the fuselage and not couple to the ring wing or may extend from the ring wing and not couple to the fuselage. In some implementations, one or more stabilizer fins may extend from the exterior of the ring wing 107, one or more stabilizer fins may extend from the interior of the ring wing 107, one or more stabilizer fins may extend from the fuselage 110, and/or one or more stabilizer fins may extend from the fuselage 110 and couple to the interior of the ring wing 107.

The fuselage 110, motor arms 105, stabilizer fin 120, and ring wing 107 of the aerial vehicle 100 may be formed of any one or more suitable materials, such as graphite, carbon fiber, and/or aluminum.

Each of the propulsion mechanisms 102 are coupled to a respective motor arm 105 (or propulsion mechanism arm) such that the propulsion mechanism 102 is substantially contained within the perimeter of the ring wing 107. For example, propulsion mechanism 102-1 is coupled to motor arm 105-1, propulsion mechanism 102-2 is coupled to motor arm 105-2, propulsion mechanism 102-3 is coupled to motor arm 105-3, propulsion mechanism 102-4 is coupled to motor arm 105-4, propulsion mechanism 102-5 is coupled to motor arm 105-5, and propulsion mechanism 102-6 is coupled to motor arm 105-6. In the illustrated example, each propulsion mechanism 102-1, 102-2, 102-3, 102-4, 102-5, and 102-6 is coupled at an approximate mid-point of the respective motor arm 105-1, 105-2, 105-3, 105-4, 105-5, and 105-6 between the fuselage 110 and the ring wing 107. In other implementations, some propulsion mechanisms 102 may be coupled toward an end of the respective motor arm 105. In other implementations, the propulsion mechanisms may be coupled at other locations along the motor arm. Likewise, in some implementations, some of the propulsion mechanisms may be coupled to a mid-point of the motor arm and some of the propulsion mechanisms may be coupled at other locations along respective motor arms (e.g., closer toward the fuselage 110 or closer toward the ring wing 107).

As illustrated, the propulsion mechanisms 102 may be oriented at different angles with respect to each other. For example, propulsion mechanisms 102-2 and 102-5 are aligned with the fuselage 110 such that the force generated by each of propulsion mechanisms 102-2 and 102-5 is in-line or in the same direction or orientation as the fuselage. In the illustrated example, the aerial vehicle 100 is oriented for horizontal flight such that the fuselage is oriented horizontally in the direction of travel. In such an orientation, the propulsion mechanisms 102-2 and 102-5 provide horizontal forces, also referred to herein as thrusting forces and act as thrusting propulsion mechanisms.

In comparison to propulsion mechanisms 102-2 and 102-5, each of propulsion mechanisms 102-1, 102-3, 102-4, and 102-6 are offset or angled with respect to the orientation of the fuselage 110. When the aerial vehicle 100 is oriented horizontally as shown in FIG. 1 for horizontal flight, the propulsion mechanisms 102-1, 102-3, 102-4, and 102-6 may be used as propulsion mechanisms, providing thrust in a non-horizontal direction to cause the aerial vehicle to pitch, yaw, roll, heave and/or sway. In other implementations, during horizontal flight, the propulsion mechanisms 102-1, 102-3, 102-4, and 102-6 may be disabled such that they do not produce any forces and the aerial vehicle 100 may be propelled aerially in a horizontal direction as a result of the lifting force from the aerodynamic shape of the ring wing 107 and the horizontal thrust produced by the thrusting propulsion mechanisms 102-2 and 102-5.

In some implementations, one or more segments of the ring wing 107 may include ailerons, control surfaces, and/or trim tabs 109 that may be adjusted to control the aerial flight of the aerial vehicle 100. For example, one or more ailerons, control surfaces, and/or trim tabs 109 may be included on the upper segment 107-1 of the ring wing 107 and/or one or more ailerons, control surfaces, and/or trim tabs 109 may be included on the side segments 107-4 and/or 107-3. Further, one or more ailerons, control surfaces, and/or trim tabs 109 may also be included on one or more of the remaining segments 107-2, 107-5, and 107-6. The ailerons, control surfaces, and/or trim tabs 109 may be operable to control the pitch, yaw, and/or roll of the aerial vehicle during horizontal flight when the aerial vehicle 100 is oriented as illustrated in FIG. 1.

The angle of orientation of each of the propulsion mechanism 102-1, 102-2, 102-3, 102-4, 102-5, and 102-6 may vary for different implementations. Likewise, in some implementations, the offset of the propulsion mechanisms 102-1, 102-2, 102-3, 102-4, 102-5, and 102-6 may each be the same, with some oriented in one direction and some oriented in another direction, may each be oriented different amounts, and/or in different directions.

In the illustrated example of FIG. 1, each propulsion mechanism 102-1, 102-2, 102-3, 102-4, 102-5, and 102-6 may be oriented approximately thirty degrees with respect to the position of each respective motor arm 105-1, 105-2, 105-3, 105-4, 105-5, and 105-6. In addition, the direction of orientation of the propulsion mechanisms is such that pairs of propulsion mechanisms are oriented toward one another. For example, propulsion mechanism 102-1 is oriented approximately thirty degrees toward propulsion mechanism 102-6. Likewise, propulsion mechanism 102-2 is oriented approximately thirty degrees in a second direction about the second motor arm 105-2 and oriented toward propulsion mechanism 102-3. Finally, propulsion mechanism 102-4 is oriented approximately thirty degrees in the first direction about the fourth motor arm 105-4 and toward propulsion 102-5. As illustrated, propulsion mechanisms 102-2 and 102-5, which are on opposing sides of the fuselage 110, are aligned and oriented in a same first direction (in this example, horizontal). Propulsion mechanisms 102-3 and 102-6, which are on opposing sides of the fuselage 110, are aligned and oriented in a same second direction, which is angled compared to the first direction. Propulsion mechanisms 102-1 and 102-4, which are on opposing sides of the fuselage 110, are aligned and oriented in a same third direction, which is angled compared to the first direction and the second direction.

Figure 2:
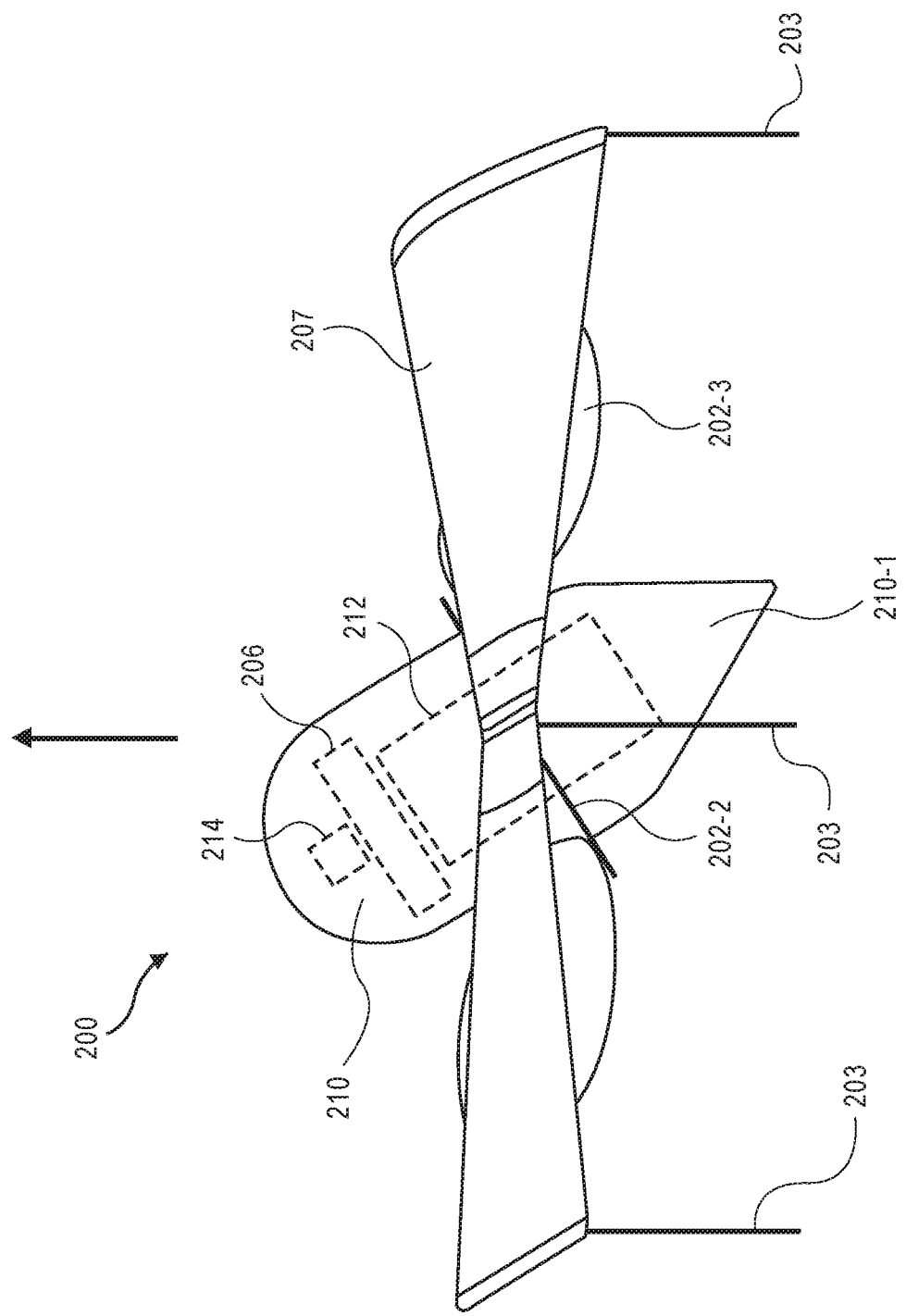

FIG. 2 illustrates a side view of the aerial vehicle 200 oriented for vertical takeoff and landing (VTOL), in accordance with disclosed implementations. The aerial vehicle 200 corresponds to the aerial vehicle 100 discussed above with respect to FIG. 1. When oriented as illustrated in FIG. 2, the aerial vehicle may maneuver in any of the six degrees of freedom (pitch, yaw, roll, heave, surge, and sway), thereby enabling VTOL and high maneuverability.

As illustrated, when the aerial vehicle is oriented for VTOL, the motor arms and the ring wing 207 are aligned approximately horizontally and in the same plane. In this orientation, each of the propulsion mechanisms are offset or angled (canted) with respect to the horizontal and/or vertical direction. As such, each propulsion mechanism 202, when generating a force, generates a force that includes both a horizontal component and a vertical component. In the illustrated example, each propulsion mechanism is angled approximately thirty degrees with respect to vertical. Likewise, as discussed above, adjacent propulsion mechanisms are angled in opposing directions to form pairs of propulsion mechanisms. For example, propulsion mechanism 202-2 is oriented toward propulsion mechanism 202-3. As discussed further below, angling adjacent propulsion mechanisms toward one another to form pairs of propulsion mechanisms allows horizontal forces from each propulsion mechanism to cancel out such that the pair of propulsion mechanisms can produce a net vertical force. Likewise, if one of the propulsion mechanisms of a pair of propulsion mechanisms is producing a larger force than the other propulsion mechanism of the pair, a net horizontal force will result from the pair of propulsion mechanisms. Accordingly, when the aerial vehicle 200 is oriented for VTOL with angled propulsion mechanisms, as illustrated in FIG. 2, the aerial vehicle can move independently in any of the six degrees of freedom. For example, if the aerial vehicle is to surge in the X direction, it can do so by altering the forces produced by the propulsion mechanisms to generate a net horizontal force in the X direction without having to pitch forward to enable a surge in the X direction.

To enable the fuselage to be oriented horizontally with an offset ring wing 207 during horizontal flight, as illustrated in FIG. 1, the fuselage is rotated at an angle when the aerial vehicle 200 is oriented for VTOL, as illustrated in FIG. 2. In this example the fuselage 210 is angled at approximately thirty degrees from vertical. In other implementations, the amount of rotation from vertical may be greater or less depending on the amount of offset desired for the ring wing 207 when the aerial vehicle 200 is oriented for horizontal flight.

The aerial vehicle may also include one or more landing gears 203 that are extendable to a landing position, as illustrated in FIG. 2. During flight, the landing gear 203 may be retracted into the interior of the ring wing 207 and/or may be rotated up and remain along the trailing edge of the ring wing. In still other examples, the landing gear may be permanently affixed.

The fuselage 210 may be used to house or store one or more components of the aerial vehicle, such as the aerial vehicle control system 214, a power module 206, and/or a payload 212 that is transported by the aerial vehicle. The aerial vehicle control system is discussed further below. The power module(s) 206 may be removably mounted to the aerial vehicle 200. The power module(s) 206 for the aerial vehicle may be, for example, in the form of battery power, solar power, gas power, super capacitor, fuel cell, alternative power generation source, or a combination thereof. The power module(s) 206 are coupled to and provide power for the aerial vehicle control system 214, the propulsion mechanisms 202, and the payload engagement module 210-1.

In some implementations, one or more of the power modules may be configured such that it can be autonomously removed and/or replaced with another power module. For example, when the aerial vehicle lands at a delivery location, relay location and/or materials handling facility, the aerial vehicle may engage with a charging member at the location that will recharge the power module.

The payload 212 may be any payload that is to be transported by the aerial vehicle. In some implementations, the aerial vehicle may be used to aerially deliver items ordered by customers for aerial delivery and the payload may include one or more customer ordered items. For example, a customer may order an item from an electronic commerce website and the item may be delivered to a customer specified delivery location using the aerial vehicle 200.

In some implementations, the fuselage 210 may include a payload engagement module 210-1. For example, the payload engagement module 210-1 may be a hinged portion of the fuselage 210 that can rotate between an open position, in which the interior of the fuselage is accessible so that the payload 212 may be added to or removed from the fuselage, and a closed position, as illustrated in FIG. 2, so that the payload 212 is secured within the interior of the fuselage.

Figure 3:
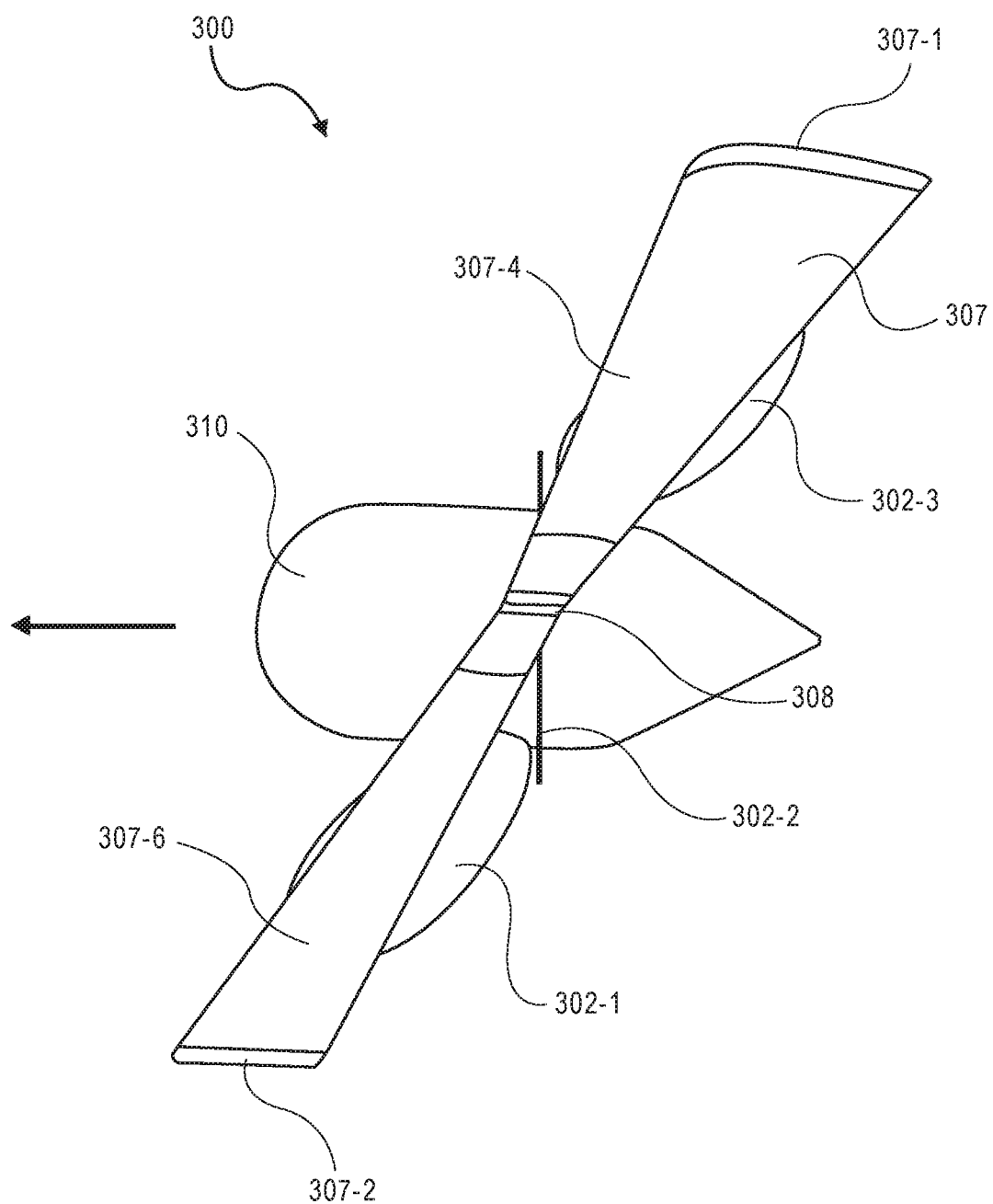

FIG. 3 is a side view of an aerial vehicle 300 with a ring wing 307, in accordance with disclosed implementations. The aerial vehicle 300 corresponds to the aerial vehicle 100 discussed in FIG. 1 and aerial vehicle 200 discussed in FIG. 2. As illustrated, when the aerial vehicle is oriented for horizontal flight, as illustrated in FIG. 3, the fuselage 310 is oriented horizontally and two of the propulsion mechanisms, propulsion mechanism 302-2 and the propulsion mechanism on the opposing side of the fuselage and illustrated in FIG. 1, are oriented to produce thrust in a substantially horizontal direction. In comparison, the other propulsion mechanisms, such as propulsion mechanisms 302-1 and 302-3, are not oriented to produce forces in substantially the horizontal direction. During horizontal flight, the propulsion mechanisms, such as propulsion mechanisms 302-1 and 302-3, may be disabled and/or used to produce maneuverability forces that will cause the aerial vehicle to pitch, yaw, and/or roll as it aerially navigates in a substantially horizontal direction. In some implementations, the propulsion mechanisms that are not aligned to produce substantially horizontal forces may be allowed to freely rotate in the wind and energy produced from the rotation may be used to charge the power module of the aerial vehicle 300.

The ring wing 307 is angled such that the lower segment 307-2 of the ring wing is positioned ahead of the upper segment 307-1 of the ring wing 307. The leading wing, lower segment 307-2 produces a much higher lift per square inch than the rear wing, upper segment 307-1, and the chord length of the lower segment 307-2 is less than the chord length of the upper segment 307-1. Likewise, as illustrated, the upper segment 307-1 of the ring wing has a different camber than the lower segment 307-2. The chord length and camber transition from that illustrated along the upper segment 307-1 to the lower segment 307-2. In implementations that include one or more stabilizer fins, such as stabilizer fin 120 (FIG. 1), the difference between the chord lengths of the lower segment 307-2 and the upper segment 307-1 may be less and/or the difference between the cambers of the lower segment 307-2 and the upper segment 307-1 may be less.

While the side segments, such as side segment 307-4 and segment 307-6 of the ring wing provide some lift, at the midpoint 308 of each side segment there is minimal lift produced by the ring wing 307. Because there is minimal lift produced at the midpoint 308, the segments may be tapered to reduce the overall weight of the aerial vehicle. In this example, the side segments, such as side segments 307-4 and 307-6, are tapered toward the mid-point but retain some dimension for structural integrity and to operate as a protective barrier around the propulsion mechanisms 302. While the illustrated examples show both side segments 307-4 and 307-6 tapering to a smaller end at the midpoint 308, in other implementations, the taper may be consistent from the larger top segment 307-1 to the smaller lower segment 307-2.

In addition to providing lift, the ring wing 307 provides a protective barrier or shroud that surrounds the propulsion mechanisms of the aerial vehicle 300. The protective barrier of the ring wing 307 increases the safety of the aerial vehicle. For example, if the aerial vehicle comes into contact with another object, there is a higher probability that the object will contact the ring wing, rather than a propulsion mechanism.

Figure 4:
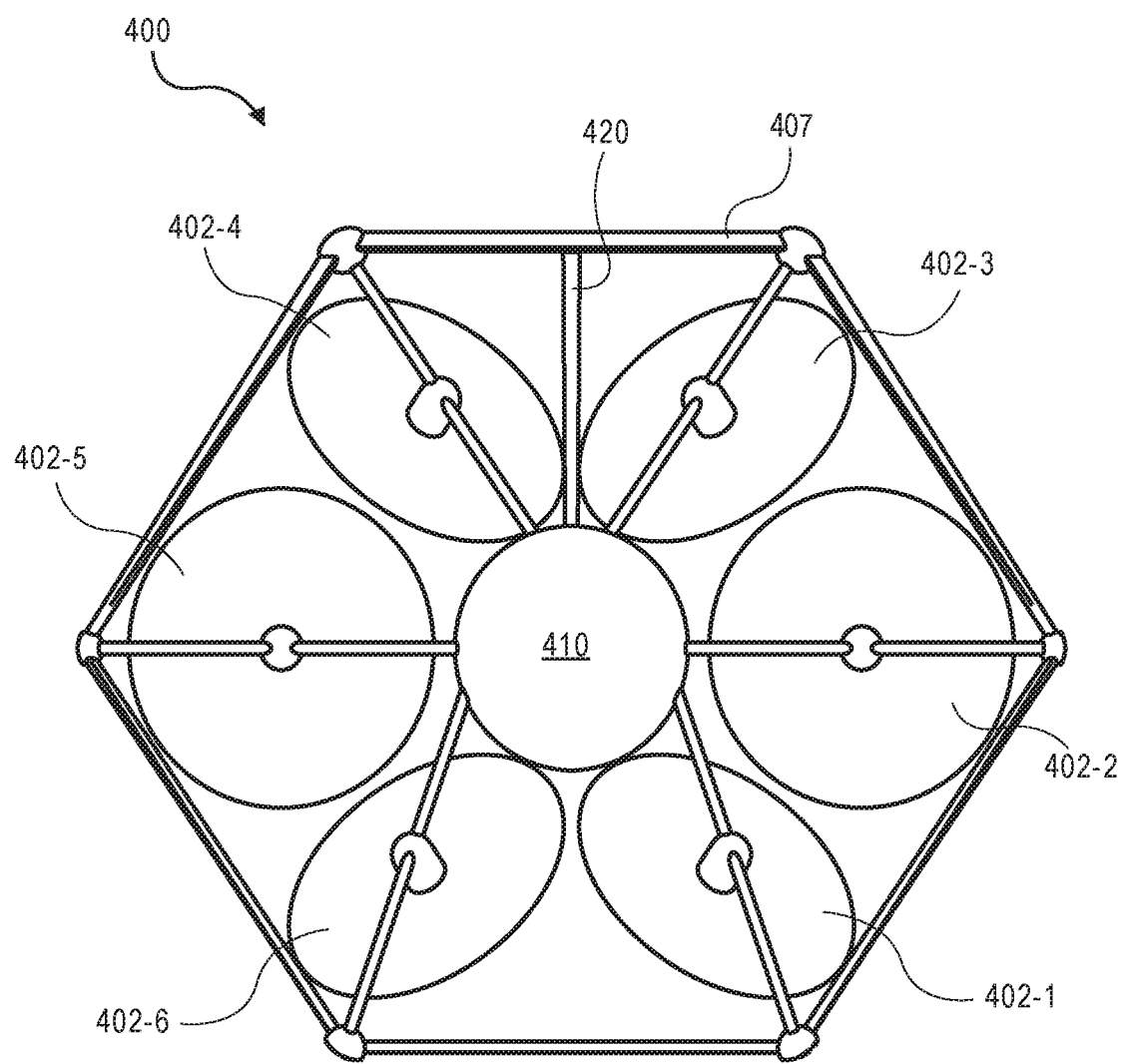

FIG. 4 is a front-on view of an aerial vehicle 400 with a ring wing 407 having a substantially hexagonal shape, according to disclosed implementations. The aerial vehicle 400 corresponds to aerial vehicle 100 of FIG. 1, aerial vehicle 200 of FIG. 2, and aerial vehicle 300 of FIG. 3. As discussed above with respect to FIG. 3, when the aerial vehicle is oriented for horizontal flight, as illustrated in FIGS. 3 and 4, the fuselage 410 is oriented in the direction of travel, the ring wing 407 is oriented in the direction of travel such that it will produce a lifting force, and propulsion mechanisms 402-2 and 402-5, which are on opposing sides of the fuselage 410, are aligned to produce forces in the substantially horizontal direction to propel or thrust the aerial vehicle horizontally. The other propulsion mechanisms 402-1, 402-3, 402-4, and 402-6 are offset and may be disabled, used to produce maneuverability forces, and/or allowed to freely rotate and produce energy that is used to charge a power module of the aerial vehicle 400. By increasing the thrust produced by each of the propulsion mechanisms 402-2 and 402-5, the horizontal speed of the aerial vehicle increases. Likewise, the lifting force from the ring wing 407 also increases. In some implementations, one or more ailerons, such as those discussed above with respect to FIG. 1, may be included on the surface of the ring wing and used to control the aerial navigation of the aerial vehicle during horizontal flight. Likewise, one or more stabilizer fins 420 may be included to stabilize the aerial vehicle during horizontal flight.

Figure 5:
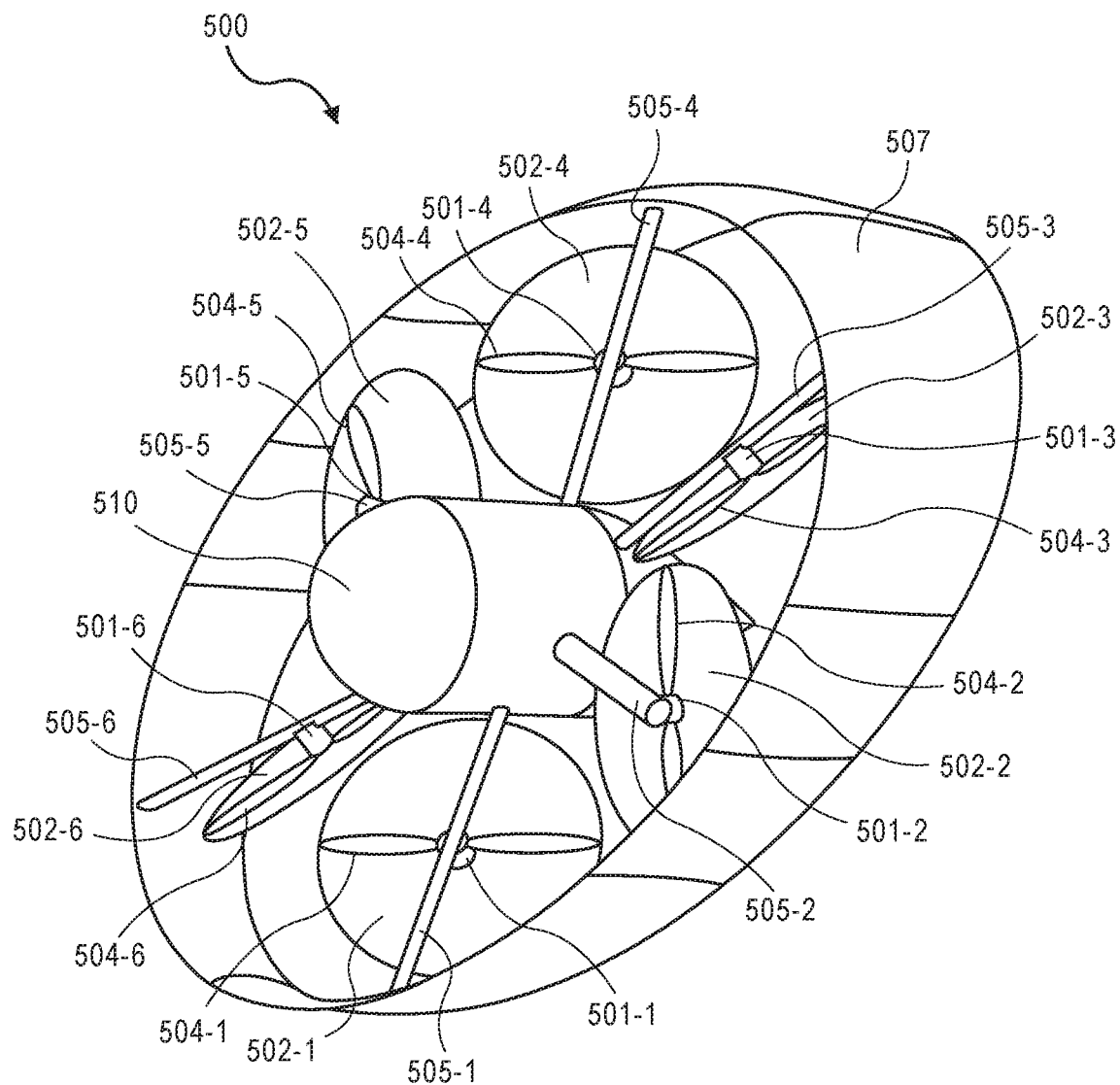
FIG. 5 illustrates a view of an aerial vehicle with a substantially circular shaped ring wing, in accordance with disclosed implementations.

In some implementations, the hexagonal shaped ring wing may decrease manufacturing costs, provide for more stable flight, and provide flatter surfaces upon which control elements, such as ailerons, may be included, in comparison to a substantially circular shaped ring wing as described herein with respect to FIG. 5. Likewise, other components may be coupled to the surface of the ring wing. Other components include, but are not limited to, sensors, imaging elements, range finders, identifying markers, navigation components, such as global positioning satellite antennas, antennas, etc.

To transition the aerial vehicle from a VTOL orientation, as illustrated in FIG. 2, to a horizontal flight orientation, as illustrated in FIGS. 3 and 4, forces generated by each of the propulsion mechanisms 402 will cause the aerial vehicle to pitch forward and increase in speed in the horizontal direction. As the horizontal speed increases and the pitch increases, the lifting force produced by the airfoil shape of the ring wing will increase which will further cause the aerial vehicle to pitch into the horizontal flight orientation and allow the aerial vehicle to remain airborne.

In contrast, as discussed below, when the aerial vehicle is to transition from a horizontal flight orientation to a VTOL orientation, forces from the propulsion mechanisms may cause the aerial vehicle to decrease pitch and reduce horizontal speed. As the pitch of the aerial vehicle decreases, the lift produced by the airfoil shape of the ring wing decreases and the thrust produced by each of the six propulsion mechanisms 402 are utilized to maintain flight of the aerial vehicle 400.

As illustrated in FIGS. 1-4, each of the propulsion mechanisms 402 are positioned in approximately the same plane that is substantially aligned with the ring wing. Likewise, each propulsion mechanism 402 is spaced approximately sixty degrees from each other around the fuselage 410, such that the propulsion mechanisms are positioned at approximately equal distances with respect to one another and around the fuselage 410 of the aerial vehicle 400. For example, the second propulsion mechanism 402-2 and the fifth propulsion mechanism 402-5 may each be positioned along the X axis. The third propulsion mechanism 402-3 may be positioned at approximately sixty degrees from the X axis and the fourth propulsion mechanism 402-4 may be positioned approximately one-hundred and twenty degrees from the X axis. Likewise, the first propulsion mechanism 402-1 and the sixth propulsion mechanism 402-6 may likewise be positioned approximately sixty and one-hundred and twenty degrees from the X axis in the negative direction.

In other implementations, the spacing between the propulsion mechanisms may be different. For example, propulsion mechanisms 402-1, 402-3, and 402-5, which are oriented in the first direction, may each be approximately equally spaced 120 degrees apart and propulsion mechanisms 402-2, 402-4, and 402-6, which are oriented in the second direction, may also be approximately equally spaced 120 degrees apart. However, the spacing between propulsion mechanisms oriented in the first direction and propulsion mechanisms oriented in the second direction may not be equal. For example, the propulsion mechanisms 402-1, 402-3, and 402-5, oriented in the first direction, may be positioned at approximately zero degrees, approximately 120 degrees, and approximately 240 degrees around the perimeter of the aerial vehicle with respect to the X axis, and the propulsion mechanisms 402-2, 402-4, and 402-6, oriented in the second direction, may be positioned at approximately 10 degrees, approximately 130 degrees, and approximately 250 degrees around the perimeter of the aerial vehicle 400 with respect to the X axis.

In other implementations, the propulsion mechanisms may have other alignments. Likewise, in other implementations, there may be fewer or additional propulsion mechanisms. Likewise, in some implementations, the propulsion mechanisms may not all be aligned in the same plane and/or the ring wing may be in a different plane than some or all of the propulsion mechanisms.

While the examples discussed above and illustrated in FIGS. 1-4 discuss rotating the propulsion mechanisms approximately thirty degrees about each respective motor arm and that the ring wing is offset approximately thirty degrees with respect to the fuselage, in other implementations, the orientation of the propulsion mechanisms and/or the ring wing may be greater or less than thirty degrees and the angle of the ring wing may be different than the angle of one or more propulsion mechanisms. In some implementations, if maneuverability of the aerial vehicle when the aerial vehicle is in VTOL orientation is of higher importance, the orientation of the propulsion mechanisms may be higher than thirty degrees. For example, each of the propulsion mechanisms may be oriented approximately forty-five degrees about each respective motor arm, in either the first or second direction. In comparison, if the lifting force of the aerial vehicle when the aerial vehicle is in the VTOL orientation is of higher importance, the orientation of the propulsion mechanisms may be less than thirty degrees. For example, each propulsion mechanism may be oriented approximately ten degrees from a vertical orientation about each respective motor arm.

In some implementations, the orientations of some propulsion mechanisms may be different than other propulsion mechanisms. For example, propulsion mechanisms 402-1, 402-3, and 402-5 may each be oriented approximately fifteen degrees in the first direction and propulsion mechanisms 402-2, 402-4, and 402-6 may be oriented approximately twenty-five degrees in the second direction. In still other examples, pairs of propulsion mechanisms may have different orientations than other pairs of propulsion mechanisms. For example, propulsion mechanisms 402-1 and 402-6 may each be oriented approximately thirty degrees in the first direction and second direction, respectively, toward one another, propulsion mechanisms 402-3 and 402-2 may each be oriented approximately forty-five degrees in the first direction and second direction, respectively, toward one another, and propulsion mechanisms 402-5 and 402-4 may each be oriented approximately forty-five degrees in the first direction and second direction, respectively, toward one another.

By orienting propulsion mechanisms partially toward one another in pairs, as illustrated, the lateral or horizontal forces generated by the pairs of propulsion mechanisms, when producing the same amount of force, will cancel out such that the sum of the forces from the pair is only in a substantially vertical direction (Z direction), when the aerial vehicle is in the VTOL orientation. Likewise, if one propulsion mechanism of the pair produces a force larger than a second propulsion mechanism, a lateral or horizontal force will result in the X direction and/or the Y direction, when the aerial vehicle is in the VTOL orientation. A horizontal force produced from one or more of the pairs of propulsion mechanisms enables the aerial vehicle to translate in a horizontal direction and/or yaw without altering the pitch of the aerial vehicle, when the aerial vehicle is in the VTOL orientation. Producing lateral forces by multiple pairs of propulsion mechanisms 402 enables the aerial vehicle 400 to operate independently in any of the six degrees of freedom (surge, sway, heave, pitch, yaw, and roll). As a result, the stability and maneuverability of the aerial vehicle 400 is increased.

While the implementations illustrated in FIGS. 1-4 include six arms that extend radially from a central portion of the aerial vehicle and are coupled to the ring wing, in other implementations, there may be fewer or additional arms. For example, the aerial vehicle may include support arms that extend between the motor arms and provide additional support to the aerial vehicle. As another example, not all of the motor arms may extend to and couple with the ring wing.

FIG. 5 illustrates a view of an aerial vehicle 500 with a ring wing that is substantially cylindrical or circular in shape and that surrounds a plurality of propulsion mechanisms, in accordance with disclosed implementations. The aerial vehicle 500 includes six motors 501-1, 501-2, 501-3, 501-4, 501-5, and 501-6 and corresponding propellers 504-1, 504-2, 504-3, 504-4, 504-5, and 504-6 spaced about the fuselage 510 of the aerial vehicle 500. The propellers 504 may be any form of propeller (e.g., graphite, carbon fiber) and of any size. For example, the propellers may be 10 inch-12-inch diameter carbon fiber propellers. Likewise, some or all of the propulsion mechanisms may include a SLMR apparatus, in accordance with the disclosed implementations.

The form and/or size of some of the propellers may be different than other propellers. Likewise, the motors 501 may be any form of motor, such as a DC brushless motor, and may be of a size sufficient to rotate the corresponding propeller. Likewise, in some implementations, the size and/or type of some of the motors 501 may be different than other motors 501. In some implementations, the motors may be rotated in either direction such that the force generated by the propellers may be either a positive force, when rotating in a first direction, or a negative force, when rotating in the second direction. Alternatively, or in addition thereto, the pitch of the blades of a propeller may be variable. By varying the pitch of the blades, the force generated by the propeller may be altered to either be in a positive direction or a negative direction. Still further, in some implementations, the pitch of the blades may be adjusted such that they are aligned with the direction of travel of the aerial vehicle and thus provide significantly less drag if they are not rotating.

Each pair of motors 501 and corresponding propellers 504 will be referred to herein collectively as a propulsion mechanism 502 and/or reconfigurable propulsion mechanisms, such as propulsion mechanisms/reconfigurable propulsion mechanisms 502-1, 502-2, 502-3, 502-4, 502-5, and 502-6.

The aerial vehicle 500 also includes a ring wing 507 having a substantially cylindrical or circular shape that extends around and forms the perimeter of the aerial vehicle 500. In the illustrated example, the ring wing is substantially circular in shape and tapers toward the bottom of the aerial vehicle. The ring wing 507 has an airfoil shape to produce lift when the aerial vehicle is oriented as illustrated in FIG. 5 and moving in a direction that is substantially horizontal. As illustrated, the ring wing is positioned at an angle with respect to the fuselage 510 such that the lower part of the ring wing acts as a front wing as it is positioned toward the front of the aerial vehicle when oriented as shown and moving in a horizontal direction. The top of the ring wing, which has a longer chord length than the bottom portion of the ring wing 507, is positioned farther back and thus acts as a rear wing.

The ring wing is secured to the fuselage 510 by motor arms 505. In the illustrated example, each of motor arms 505-1, 505-3, 505-4, and 505-6 are coupled to the fuselage 510 at one end, extend from the fuselage 510 and couple to the ring wing 507 at a second end, thereby securing the ring wing 507 to the fuselage 510.

The fuselage 510, motor arms 505, and ring wing 507 of the aerial vehicle 500 may be formed of any one or more suitable materials, such as graphite, carbon fiber, and/or aluminum.

Each of the propulsion mechanisms 502 are coupled to a respective motor arm 505 (or propulsion mechanism arm) such that the propulsion mechanism 502 is substantially contained within the perimeter of the ring wing 507. For example, propulsion mechanism 502-1 is coupled to motor arm 505-1, propulsion mechanism 502-2 is coupled to motor arm 505-2, propulsion mechanism 502-3 is coupled to motor arm 505-3, propulsion mechanism 502-4 is coupled to motor arm 505-4, propulsion mechanism 502-5 is coupled to motor arm 505-5, and propulsion mechanism 502-6 is coupled to motor arm 505-6. In the illustrated example, propulsion mechanisms 502-1, 502-3, 502-4, and 502-6 are coupled at an approximate mid-point of the respective motor arm 505 between the fuselage 510 and the ring wing 507. In other implementations, the propulsion mechanisms (such as propulsion mechanisms 502-2 and 502-5 illustrated in FIG. 5) may be coupled at other locations along the motor arm. Likewise, in some implementations, some of the propulsion mechanisms may be coupled to a mid-point of the motor arm and some of the propulsion mechanisms may be coupled at other locations along respective motor arms (e.g., closer toward the fuselage 510 or closer toward the ring wing 507).

As illustrated, the propulsion mechanisms 502 may be oriented at different angles with respect to each other. For example, propulsion mechanisms 502-2 and 502-5 are aligned with the fuselage 510 such that the force generated by each of propulsion mechanisms 502-2 and 502-5 is in-line or in the same direction or orientation as the fuselage. In the illustrated example, the aerial vehicle 500 is oriented for horizontal flight such that the fuselage is oriented horizontally in the direction of travel. In such an orientation, the propulsion mechanisms 502-2 and 502-5 provide horizontal forces, also referred to herein as thrusting forces, and act as thrusting propulsion mechanisms.

In comparison to propulsion mechanisms 502-2 and 502-5, each of propulsion mechanisms 502-1, 502-3, 502-4, and 502-6 are offset or angled with respect to the orientation of the fuselage 510. When the aerial vehicle 500 is oriented horizontally as shown in FIG. 5 for horizontal flight, the propulsion mechanisms 502-1, 502-3, 502-4, and 502-6 may be used as propulsion mechanisms, providing thrust in a non-horizontal direction to cause the aerial vehicle to pitch, yaw, roll, heave and/or sway. In other implementations, during horizontal flight, the propulsion mechanisms 502-1, 502-3, 502-4, and 502-6 may be disabled such that they do not produce any forces and the aerial vehicle 500 may be propelled aerially in a horizontal direction as a result of the lifting force from the aerodynamic shape of the ring wing 507 and the horizontal thrust produced by the thrusting propulsion mechanisms 502-2 and 502-5.

The angle of orientation of each of the propulsion mechanisms 502-1, 502-3, 502-4, and 502-6 may vary for different implementations. Likewise, in some implementations, the offset of the propulsion mechanisms 502-1, 502-3, 502-4, and 502-6 may each be the same, with some oriented in one direction and some oriented in another direction, may each be oriented different amounts, and/or in different directions.

In the illustrated example of FIG. 5, each propulsion mechanism 502-1, 502-2, 502-3, 502-4, 502-5, and 502-6 may be oriented approximately thirty degrees with respect to the position of each respective motor arm 505-1, 505-2, 505-3, 505-4, 505-5, and 505-6. In addition, the direction of orientation of the propulsion mechanisms is such that pairs of propulsion mechanisms are oriented toward one another. For example, propulsion mechanism 502-1 is oriented approximately thirty degrees toward propulsion mechanism 502-6. Likewise, propulsion mechanism 502-2 is oriented approximately thirty degrees in a second direction about the second motor arm 505-2 and oriented toward propulsion mechanism 502-3. Finally, propulsion mechanism 502-4 is oriented approximately thirty degrees in the first direction about the fourth motor arm 505-4 and toward propulsion mechanism 502-5. As illustrated, propulsion mechanisms 502-2 and 502-5, which are on opposing sides of the fuselage 110, are aligned and oriented in a same first direction (in this example, horizontal). Propulsion mechanisms 502-3 and 502-6, which are on opposing sides of the fuselage 510, are aligned and oriented in a same second direction, which is angled compared to the first direction. Propulsion mechanisms 502-1 and 502-4, which are on opposing sides of the fuselage 510, are aligned and oriented in a same third direction, which is angled compared to the first direction and the second direction.

Various other features, variations, modifications, and/or example implementations described herein with respect to FIGS. 1-4 may also be combined and/or incorporated into the aerial vehicle 500 as illustrated in FIG. 5.

While the examples discussed above in FIGS. 1-5 describe a ring wing in either a substantially hexagonal shape (FIGS. 1-4) or a substantially circular shape (FIG. 5), in other implementations, the ring wing may have other shapes. For example, the ring wing may be substantially square, rectangular, pentagonal, octagonal, etc. Further, while the examples discussed above include six propulsion mechanism arms, six propulsion mechanisms, and six propellers, in other example implementations, the implementations described herein enable reconfiguration of the reconfigurable motor apparatus, also referred to herein as propulsion mechanisms, may be implemented on various other types of aerial vehicles, such as aerial vehicles having fewer than six propulsion mechanism arms, motors, and propellers, aerial vehicles having greater than six propulsion mechanism arms, motors, and propellers, and/or aerial vehicles having configurations different from those described herein, such as quad-copters, octa-copters, or other configurations.

Figure 6A:
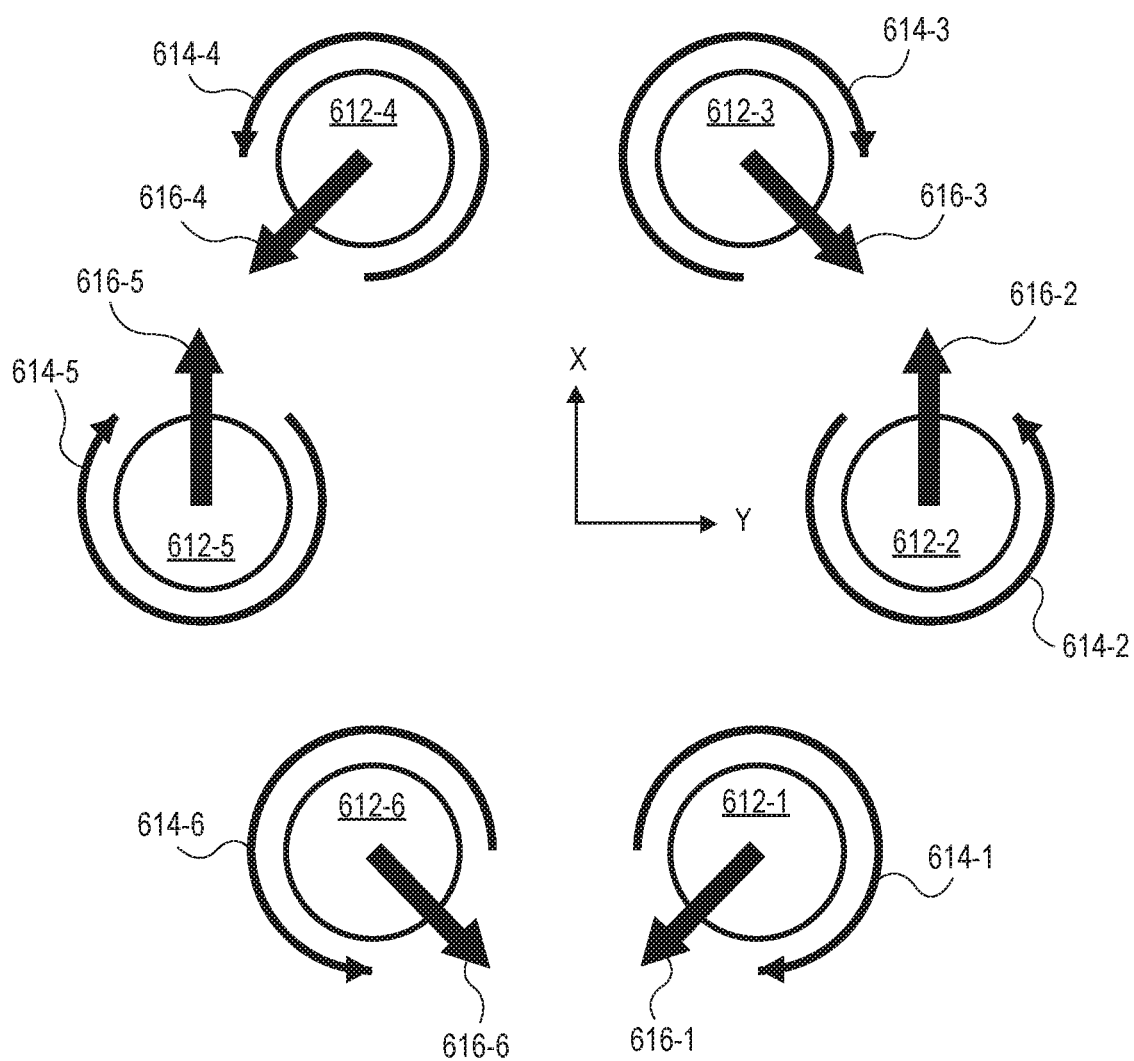
FIG. 6A illustrates forces and yaw torque polarities generated by propulsion mechanisms of a canted-hex aerial vehicle from an x-y coordinate perspective, in accordance with disclosed implementations.

FIG. 6A illustrates forces 616 and yaw torque polarities 614 generated by propulsion mechanisms 612 of a canted-hex aerial vehicle in which the propulsion mechanisms have different cant angles, such as those discussed above with respect to FIGS. 1-5, in accordance with disclosed implementations. As noted above, the illustrated yaw torque polarities are those produced due to thrust generated by the respective propulsion mechanisms, not necessarily the spin direction of the propulsion mechanisms. In addition, as will be appreciated and as discussed herein, the disclosed implementations reverse the yaw torque polarities of one or more propulsion mechanisms without altering the spin direction of those propulsion mechanisms.

As discussed above, the propulsion mechanisms may be angled or canted toward one another in pairs so that the lateral forces and yaw torque polarities generated by the propulsion mechanisms of the pair cancel each other out when producing similar forces. By canting the propulsion mechanisms 612, horizontal forces 616 are generated by the thrust produced from the propulsion mechanisms 612 when the propulsion mechanisms are operating in a positive direction. The presence of horizontal forces significantly increases the yaw-torque capability of each propulsion mechanism 612.

In the example illustrated with respect to FIG. 6A, propulsion mechanism 612-3 is canted toward propulsion mechanism 612-2 and propulsion mechanism 612-2 is canted toward propulsion mechanism 612-3, thereby forming a pair of propulsion mechanisms in which the lateral forces 616-3, 616-2 produced by the pair of propulsion mechanisms 612-3, 612-2 substantially cancel each other out when similar forces are generated by the pair of propulsion mechanisms, leaving a thrust force in substantially the z direction. Likewise, in examples in which the propulsion mechanisms generate a yaw torque, such as yaw torques 614-3, 614-2, the pair may be arranged so that the yaw torque polarities of the pair of propulsion mechanisms cancel each other out when similar forces are generated.

Each propulsion mechanism may be paired with another propulsion mechanism. Continuing with FIG. 6A, propulsion mechanism 612-1 is canted toward propulsion mechanism 612-6 and propulsion mechanism 612-6 is canted toward propulsion mechanism 612-1, thereby forming a second pair of propulsion mechanisms in which the lateral forces 616-1, 616-6 produced by the pair of propulsion mechanisms 612-1, 612-6 substantially cancel each other out when similar forces are generated by the pair of propulsion mechanisms, leaving a lifting force in substantially the z direction. Likewise, in examples in which the propulsion mechanisms generate a yaw torque, such as yaw torques 614-1, 614-6, the pair may be arranged so that the yaw torque polarities of the pair of propulsion mechanisms cancel each other out when similar forces are generated. Finally, in this example, propulsion mechanism 612-5 is canted toward propulsion mechanism 612-4 and propulsion mechanism 612-4 is canted toward propulsion mechanism 612-5, thereby forming a third pair of propulsion mechanisms in which the lateral forces 616-5, 616-4 produced by the pair of propulsion mechanisms 612-5, 612-4 substantially cancel each other out when similar forces are generated by the pair of propulsion mechanisms, leaving a lifting force in substantially the z direction. Likewise, in examples in which the propulsion mechanisms generate a yaw torque, such as yaw torques 614-5, 614-4, the pair may be arranged so that the yaw torque polarities of the pair of propulsion mechanisms cancel each other out when similar forces are generated.

During operation of example aerial vehicles, such as those illustrated and described with respect to FIGS. 1-5, various types of faults or failure modes may arise that result in degraded operational states of the aerial vehicles. For example, one or more of the propulsion mechanisms of a hexa-rotor aerial vehicle, such as those illustrated in FIGS. 1-5, also referred to herein as a canted-hex aerial vehicle, may no longer operate normally due to various types of faults, which may be referred to as motor-out situations. In order to improve the reliability, safety, and operational capability of the aerial vehicles, one or more of the other propulsion mechanisms may be moved from a normal operating position to a reconfigured operating position, thereby reversing the yaw torque polarity produced by the propulsion mechanism, as necessary, to restore alternating yaw torque polarities between propulsion mechanisms of the aerial vehicle.

The various types of faults that may result in motor-out situations may include damage or loss of function of one or more propellers or propeller blades, damage or loss of function of one or more motors, damage or loss of function of one or more propulsion mechanism controllers that are each in communication with a corresponding propulsion mechanism, damage or loss of function between one or more propulsion mechanism controllers and a flight controller that is in communication with each of the propulsion mechanism controllers, loss of power or other electrical signals between two or more components of the aerial vehicle, or various other types of faults.

In addition, the various types of faults may be detected in various manners. For example, damage or loss of function of one or more propellers or propeller blades may be detected by comparison of actual values of motor RPM and applied current with expected values of motor RPM and applied current, since a motor rotating with damaged or missing propellers or blades may draw different values of current than expected values while rotating at a particular motor RPM. In addition, damage or loss of function of one or more motors may be detected by comparison of measured RPM versus commanded RPM, or by measurements and/or calculations related to motor efficiency. Further, various faults of one or more propellers, blades, and/or motors may be detected by one or more motor controllers, which may be provided as feedback to the flight controller. Moreover, various faults of one or more motor controllers may be detected by the flight controller.

In further example implementations, various other types of sensors may be used to detect one or more of the various types of faults that result in motor-out situations. For example, the sensors may include imaging devices or cameras that can capture images of portions of propellers, blades, and/or motors, which images may be processed to determine damage or loss of function of one or more components. In addition, the sensors may include inertial measurement units, accelerometers, gyroscopes, or similar types of sensors that may detect changes to flight operations or navigation of the aerial vehicle that may be caused by one or more faults that result in motor-out situations. Various other types of sensors may also detect aspects of flight, navigation, movement, or operation of various components of the aerial vehicles to identify one or more faults. Moreover, the various types of faults may be detected by various combinations of methods described herein.

In still other examples, as discussed further below, each reconfigurable propulsion mechanism may include an LTDM, which may include one or more sensors, that detect a loss of thrust from the propulsion mechanism. Still further, in some implementations, each reconfigurable propulsion mechanism may be connected with one or more other reconfigurable propulsion mechanisms such that a loss of thrust by one propulsion mechanism will automatically cause the one or more connected propulsion mechanisms to move from a normal operating position to a reconfigured operating position.

Figure 6B:
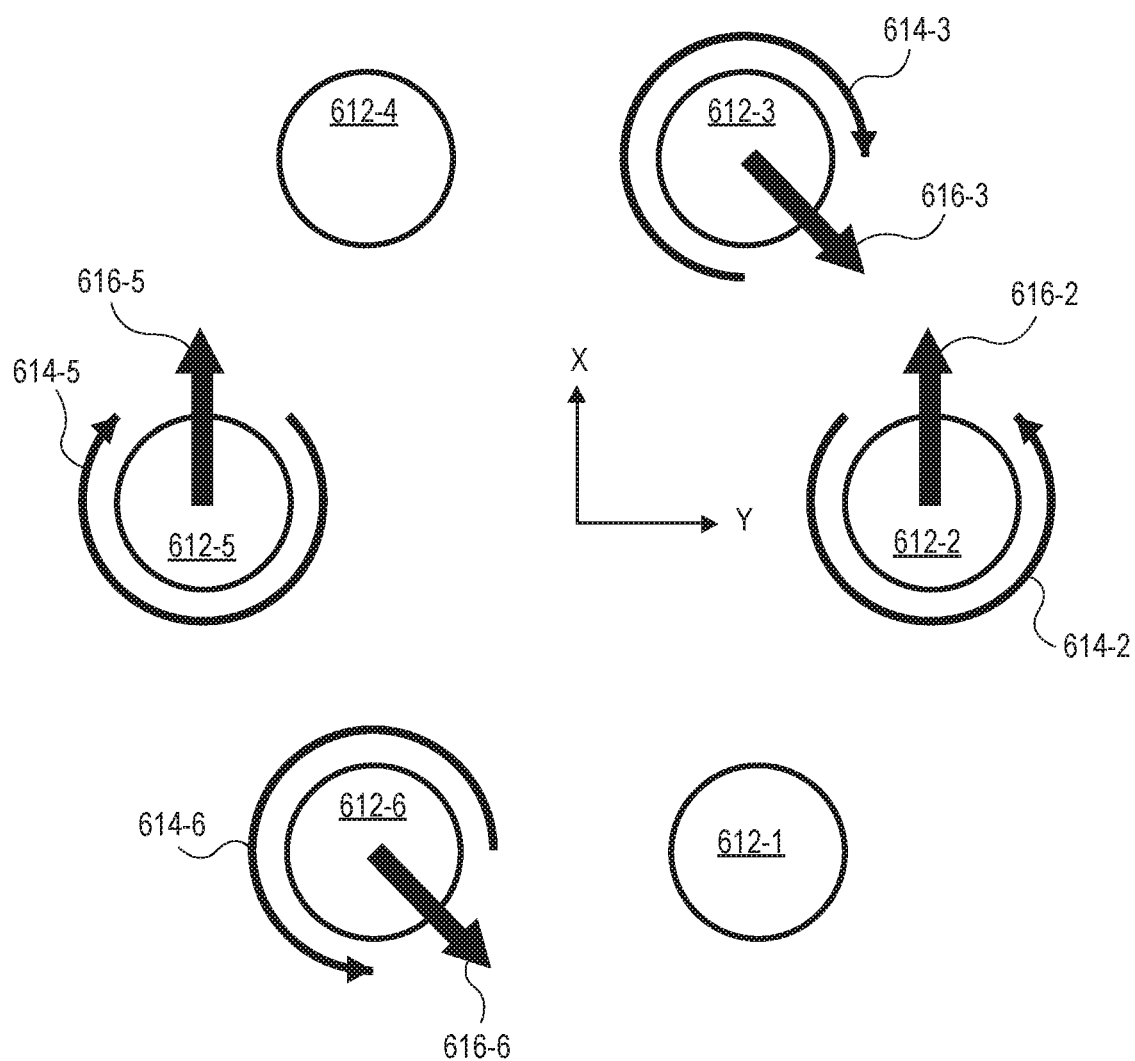
FIG. 6B illustrates various forces and yaw torque polarities generated by propulsion mechanisms of a canted-hex aerial vehicle when a first thrust is not produced by the first propulsion mechanism, in accordance with disclosed implementations.

Referring to FIG. 6B, in situations when a hex-rotor vehicle, such as those illustrated and discussed above with respect to FIGS. 1-5, experiences a motor-out event, such as a motor-out event of propulsion mechanism 612-1, the flight controller may disable an opposing propulsion mechanism 612-4 to the one that experienced the motor-out event and be left with four active propulsion mechanisms 612-2, 612-3, 612-5, 612-6, somewhat similar to that of a typical quad-rotor. However, as illustrated in FIG. 6B the aerial vehicle will be operating in a degraded manner with less than four degrees of freedom because the alternating yaw torque polarities between adjacent propulsion mechanisms will be lost and the vehicle will experience a coupling between a horizontal torque (e.g., pitch) and a vertical torque (e.g., yaw). For example, adjacent remaining operational propulsion mechanisms 612-3, 612-5 both have yaw torques 614-3, 614-5 with a first polarity, such as clockwise, and adjacent remaining operational propulsion mechanisms 612-2, 612-6 both have yaw torques 614-2, 614-6 with a second polarity, such as counterclockwise.

Figure 6C:
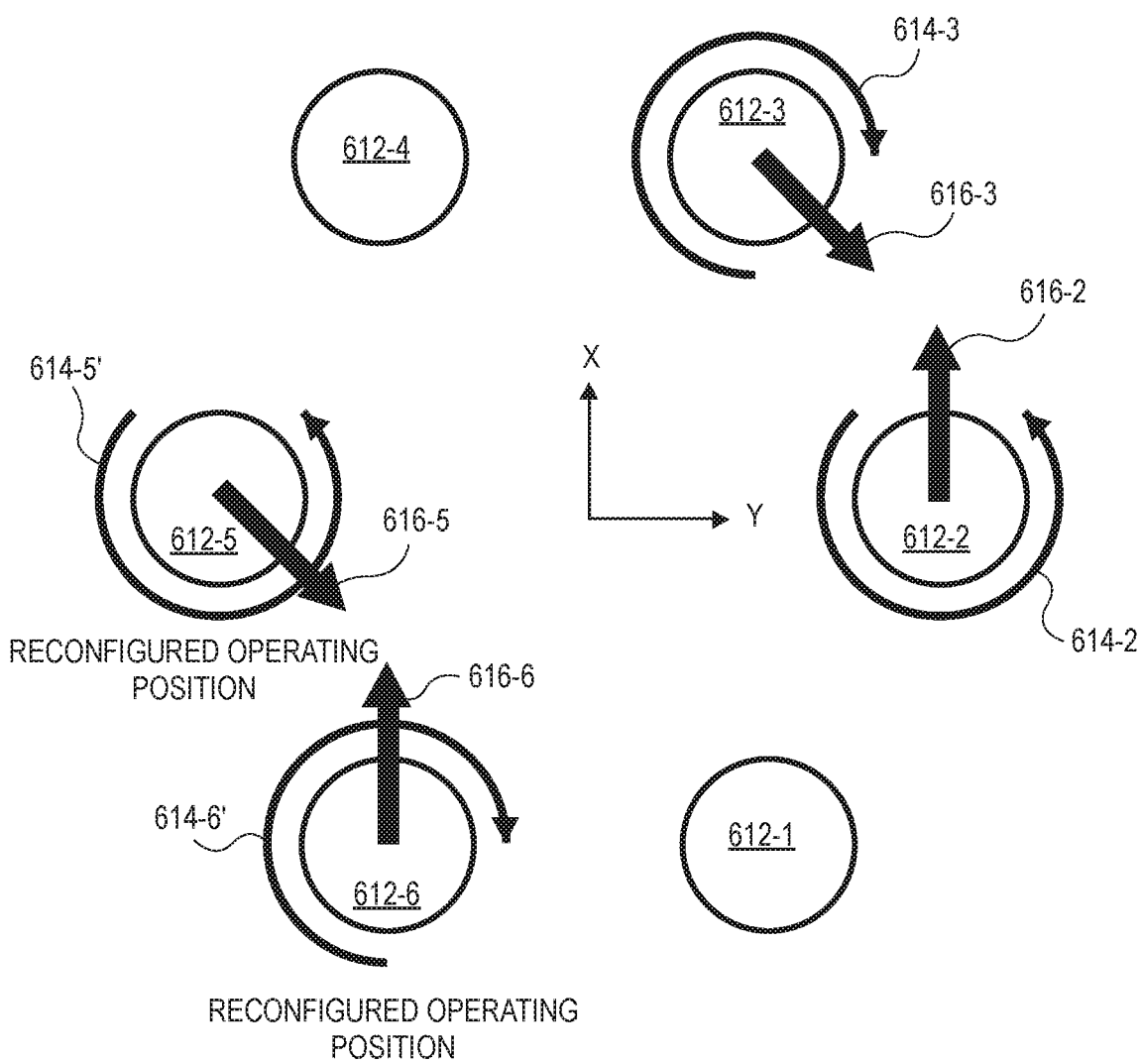
FIG. 6C illustrates various forces and yaw torque polarities generated by propulsion mechanisms of a canted-hex aerial vehicle when a first thrust is not produced by the first propulsion mechanism, an opposing propulsion mechanism is shut down, and two adjacent propulsion mechanisms between the first propulsion mechanism and the opposing propulsion mechanism are reconfigured, in accordance with disclosed implementations.

To resolve this problem, the disclosed implementations provide propulsion mechanisms that are reconfigurable between a normal operating position and a reconfigured operating position, referred to herein as a reconfigurable propulsion mechanism. As discussed further below, when a propulsion mechanism moves from the normal operating position to the reconfigured operating position, the yaw torque polarity of the propulsion mechanism is reversed, without reversing the spin direction of the propulsion mechanism. By selecting which propulsion mechanisms move from the normal operating position to the reconfigured operating position, the alternating yaw torque polarities between adjacent propulsion mechanisms is restored and the vehicle returns to a non-degraded manner of operation such that it is able to operate with at least four degrees of freedom. For example, referring to FIG. 6C, and continuing with the example of a first propulsion mechanism 612-1 experiencing a motor-out event and the opposing propulsion mechanism 612-4 being shut down, in accordance with the disclosed implementations, two of the remaining operational adjacent propulsion mechanisms between the first propulsion mechanism 612-1 and the opposing propulsion mechanism 612-4 are moved from the normal operating position to the reconfigured operating position. For example, propulsion mechanisms 612-5 and 612-6 may be moved from the normal operating position to the reconfigured operating position. As a result, the yaw torque polarity 614-5' of propulsion mechanism 612-5 reverses from the first polarity (clockwise) to the second polarity (counterclockwise) and the yaw torque polarity 614-6' reverses from the second polarity (counterclockwise) to the first polarity (clockwise). As illustrated in FIG. 6C, upon reconfiguration of propulsion mechanisms 612-5, 612-6, the alternating yaw torque polarities 614 of the four remaining operational propulsion mechanisms is restored with propulsion mechanism 612-2 producing a yaw torque 614-2 with the second polarity, propulsion mechanism 612-3 producing a yaw torque 614-3 with the first polarity, propulsion mechanism 612-5 producing a yaw torque 614-5 with the second polarity, and propulsion mechanism 612-6 producing a yaw torque 614-6 with the first polarity. In addition, by moving the two adjacent remaining operational propulsion mechanisms 612-5, 612-6 from the normal operating position to the reconfigured operating position, the cant angles of the two propulsion mechanisms change such that the two propulsion mechanisms 612-5, 612-6 are canted toward one another to form a pair of canted propulsion mechanisms.

In vehicles with other configurations of propulsion mechanisms, to restore the opposing polarities of the propulsion mechanisms, each of the adjacent remaining operational propulsion mechanisms between the propulsion mechanism that experienced the motor-out event and the opposing propulsion mechanism may be reconfigured. For example, in an octo-rotor aerial vehicle that experiences a motor-out event, the opposing propulsion mechanism will be shut down and three adjacent propulsion mechanisms between the propulsion mechanism that experienced the motor-out event and the opposing propulsion mechanism may be moved from the normal operating position to the reconfigured operating position, essentially establishing a canted-hex aerial vehicle, similar to those discussed above.

Figure 7A:
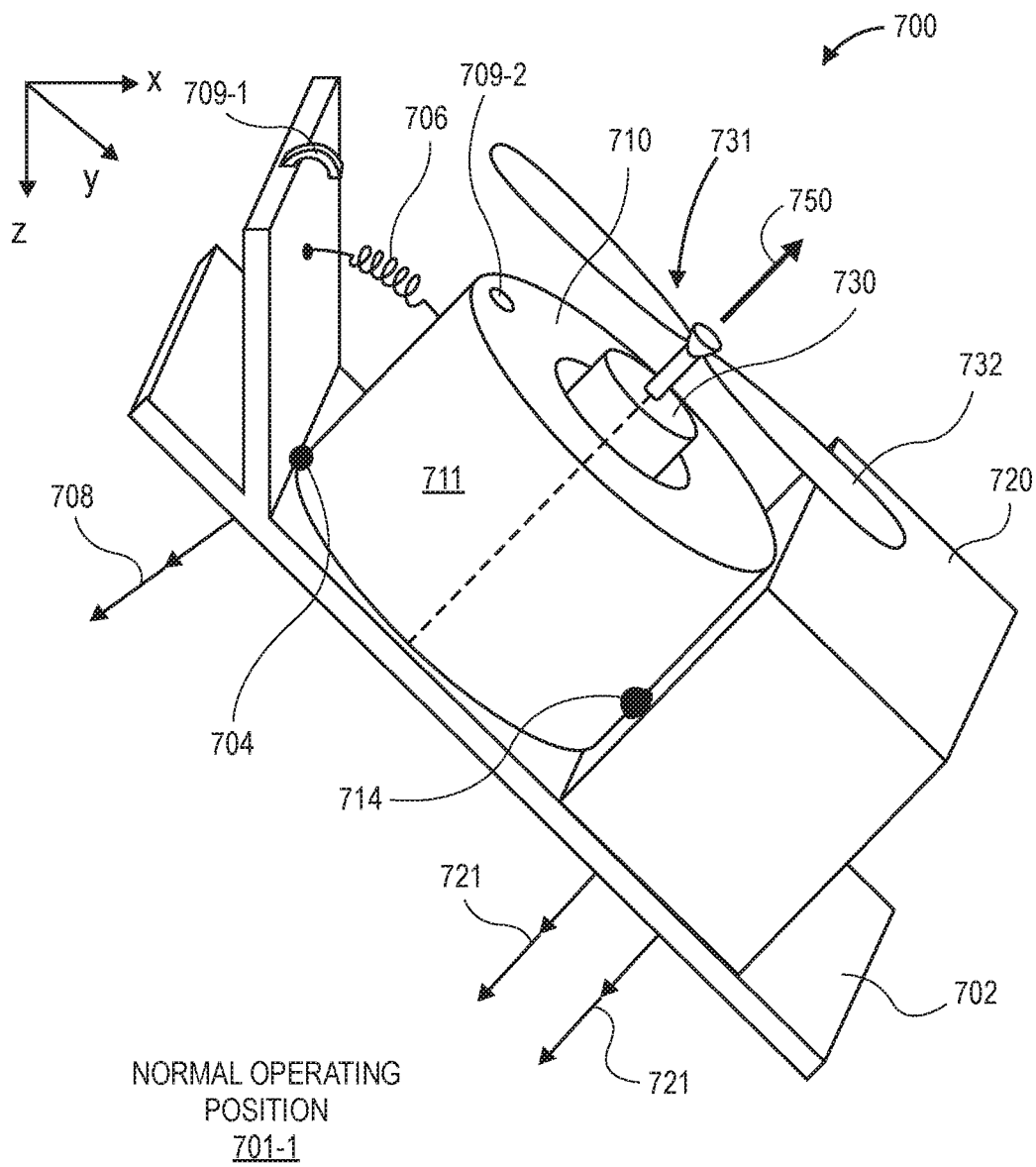
FIG. 7A illustrates an example of a reconfigurable propulsion mechanism in a normal operating position, in accordance with disclosed implementations.
Figure 7B:
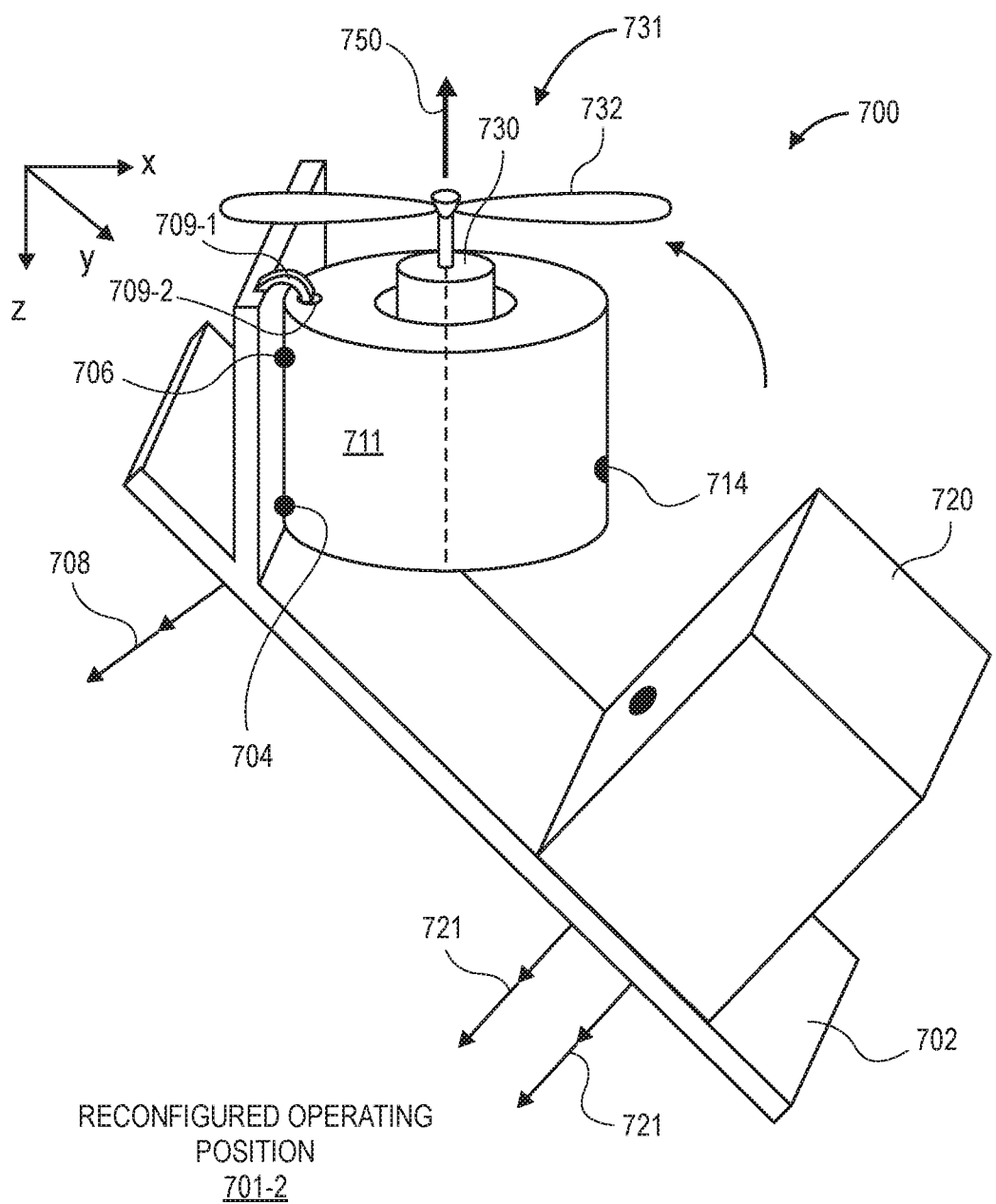
FIG. 7B illustrates an example of the reconfigurable propulsion mechanism in a reconfigured operating position, in accordance with disclosed implementations.

FIG. 7A illustrates an example of a reconfigurable propulsion mechanism 700 in a normal operating position 701-1, in accordance with disclosed implementations. FIG. 7B illustrates the example reconfigurable propulsion mechanism 700 in the reconfigured operating position 701-2.

As illustrated in FIGS. 7A through 7B, and as discussed further below, the example reconfigurable propulsion mechanism 700 may include an LTDM 710 and an RM 720. The RM 720 may be fixedly coupled to a frame 702 of the aerial vehicle. The LTDM 710 includes a housing 711 that houses all or a portion of a propulsion mechanism 731, which may include a motor 730 and a propeller 732. The housing 711 of the LTDM is pivotably coupled to the RM at a pivot point 704, such as a hinge, which enables the LTDM to move between the normal operating position 701-1 illustrated in FIG. 7A, and the reconfigured operating position 701-2, illustrated in FIG. 7B. Likewise, the housing 711 may include a notch or receiver 714 that is engaged by a latch of the RM that secures and holds the LTDM 710 in the normal operating position 701-1. When the latch disengages the housing 711 of the LTDM 710, the LTDM is able to move between the normal operating position 701-1 and the reconfigured operating position 701-2.

In some implementations, an energy storage mechanism 706, such as a spring, spring-loaded worm drive/gear, etc., may be connected between the housing 711 of the LTDM and the RM 720. In such implementations, the spring may exert a force on the LTDM 710 holding the LTDM 710 in the normal operating position 701-1 until a thrust 750 produced by the propulsion mechanism 730 coupled to the LTDM 710 exceeds the force produced by the energy storage mechanism 706. When the thrust 750 exceeds the force of the energy storage mechanism 706 and the latch is disengaged from the LTDM 710, the LTDM will rotate about the pivot 704 from the normal operating position 701-1 to the reconfigured operating position 701-2. In some implementations, the RM 720 may also include a latch 709-1 that engages with a receiving member 709-2 of the LTDM 710 and holds the LTDM 710 in the reconfigured operating position 701-2 once the LTDM 710 has moved to the reconfigured operating position, as illustrated in FIG. 7B.

In some implementations, a connection 708, which may be mechanical, electrical, electromechanical, direct, indirect, etc., may extend from the LTDM 710 and couple to an RM of another reconfigurable propulsion mechanism included in a multi-rotor aerial vehicle. Likewise, a second connection 721 which may be mechanical, electrical, electromechanical, direct, indirect, etc., may extend from the RM 720 of the reconfigurable propulsion mechanism 700 to LTDM(s) of one or more other reconfigurable propulsion mechanisms of the multi-rotor aerial vehicle. As discussed further below, the connection 708 may be used to indicate a loss of thrust of the propulsion mechanism 731 of the reconfigurable propulsion mechanism 700 that causes the connected one or more other reconfigurable propulsion mechanisms to move from the normal operating position to the reconfigured operating position.

For example, in a passive system, the connection 708 may be a wire that is connected between the LTDM 710 of the reconfigurable propulsion mechanism 700 and the RM of at least one other reconfigurable propulsion mechanism of a multi-rotor aerial vehicle. When thrust is generated by the propulsion mechanism 731, the wire is taut between the LTDM 710 and the RM of the at least one other reconfigurable propulsion mechanism, which causes the latch of the RM of the at least one other reconfigurable propulsion mechanism to remain engaged with the LTDM of the at least one other reconfigurable propulsion mechanism so that the at least one other reconfigurable propulsion mechanism remains in the normal operating position.

However, if the reconfigurable propulsion mechanism 700 experiences a motor-out even such that the propulsion mechanism 731 is not producing thrust, slack will be introduced into the connection 708 (wire) which results in the latch of the RM of the at least one other propulsion mechanism of the multi-rotor aerial vehicle disengaging and the thrust produced by that at least one other propulsion mechanism moving the LTDM of the at least one other propulsion mechanism from the normal operating position to the reconfigured operating position.

Continuing with the same example of a passive system, the connection 721 may also be a wire that is connected between the RM 720 of the reconfigurable propulsion mechanism 700 and an LTDM of at least one other reconfigurable propulsion mechanism of the multi-rotor aerial vehicle. In such an implementation, while the at least one other reconfigurable propulsion mechanism of the multi-rotor aerial vehicle is producing thrust, the connection 721 (wire) remains taut and the latch of the RM 720 remains engaged with the receiver 714 of the LTDM 710, holding the LTDM 710 in the normal operating position. However, if the at least one other reconfigurable propulsion mechanism of the multi-rotor aerial vehicle experiences a motor-out event (rather than the reconfigurable propulsion mechanism 700), slack is introduced into the connection 721, which results in the latch of the RM 720 disengaging the receiver 714 of the LTDM 710. As a result, the thrust 750 produced by the propulsion mechanism 731 causes the LTDM to move about the pivot 704 from the normal operating position 701-1 to the reconfigured operating position 701-2. Likewise, the optional one-way latch 709-1 engages with the receiver 709-2 and secures the LTDM 710 in the reconfigured operating position. In some implementations, the one-way latch 709-1 may be excluded such that the reconfigurable propulsion mechanism is stateless in that it will return to the normal operating position upon landing and powering down.

In other implementations, the connections may be electrical, electro mechanical, direct, or indirect. For example, rather than direct connections between reconfigurable propulsion mechanisms, the connections 708, 721 may connect to a flight controller and/or a propulsion mechanism controller, either or both of which may control reconfiguration of propulsion mechanisms of a multi-rotor aerial vehicle. For example, if an indication is provided on the connection 708 that the propulsion mechanism 700 is not producing thrust, the flight controller and/or propulsion mechanism controller receives that indication and sends an indication to at least one other reconfigurable propulsion mechanism of the multi-rotor aerial vehicle causing that at least one other propulsion mechanism to move from the normal operating position to the reconfigured operating position, thereby reversing the yaw torque polarity of the at least one other reconfigurable propulsion mechanism.

In some implementations, the reconfigurable propulsion mechanism may include a locking mechanism, such as a gear, pin, etc., that disables reconfiguration from the normal operating position to the reconfigured operating position when the aerial vehicle is operating in a substantially horizontal flight direction.

Additional details of an example LTDM are discussed further below with respect to FIGS. 8A through 8B. Additional details of an example RM are discussed further below with respect to FIGS. 9A through 9B. Additional details of connections between different reconfigurable propulsion mechanisms are discussed further below with respect to FIGS. 11, 12, 13A, and 13B.

Figure 8A:
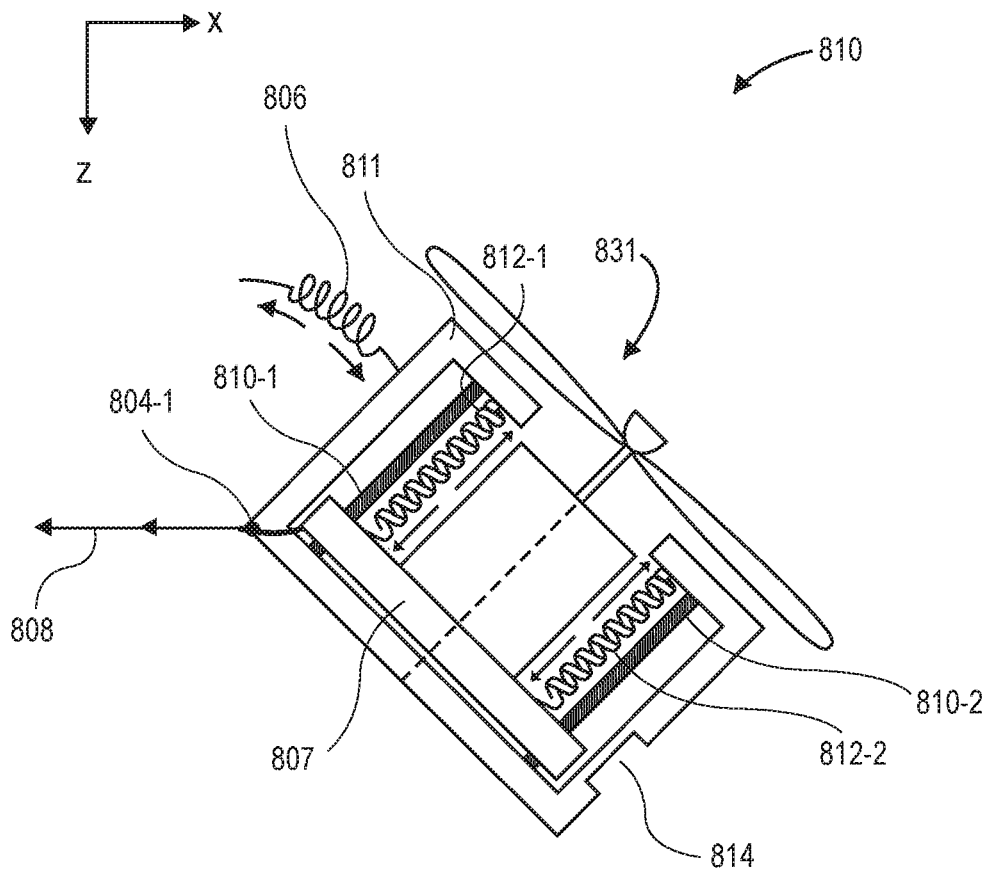
FIG. 8A illustrates an example loss of thrust detection mechanism of an example reconfigurable propulsion mechanism in a first position, in accordance with disclosed implementations.

FIG. 8A illustrates an example LTDM 810 of an example reconfigurable propulsion mechanism in a first position 803-1, in accordance with disclosed implementations. FIG. 8B illustrates the example LTDM 810 of the example reconfigurable propulsion mechanism in a second position 803-2, in accordance with disclosed implementations.

In the illustrated example, the propulsion mechanism 831 is coupled to a baseplate 807 and may move with a movement of the baseplate 807. One or more rails 810-1, 810-2, have a length and are coupled to at least one point within the housing 811. While the illustrated example shows two rails 810-1, 810-2, in other implementations additional or fewer rails may be included. For example, in some implementations three rails may be connected to the interior of the housing. The rails 810-1, 810-2 provide guides that allow adjustment or movement of the baseplate 807 within the housing in a direction parallel with the propulsion mechanism's primary thrust direction. The rails may be any form or configuration to enable movement of the baseplate. For example, the rails may be bars that fit within openings or holes of the baseplate 807, teeth or tracks that receive rolling gears of the baseplate 807, or any other configuration that allows movement of the baseplate 807 between the first position 803-1 illustrated in FIG. 8A and the second position 803-2 illustrated in FIG. 8B.

The baseplate 807 is maintained within the housing 811 and adjustable along the rails 810-1 and 810-2. Likewise, one or more energy storage mechanisms 812-1, 812-2 may be coupled between the baseplate 807 and the interior of the housing 811 that apply a force to the baseplate 807. In a state when the propulsion mechanism is not producing any thrust, for example, the multi-rotor aerial vehicle is powered off or the propulsion mechanism 831 has experienced a motor-out event, etc., the energy storage mechanisms 812-1, 812-2 exert a force, referred to herein as a first threshold, on the baseplate 807 that maintains the baseplate 807 in position 1 803-1 (FIG. 8A).

Figure 8B:
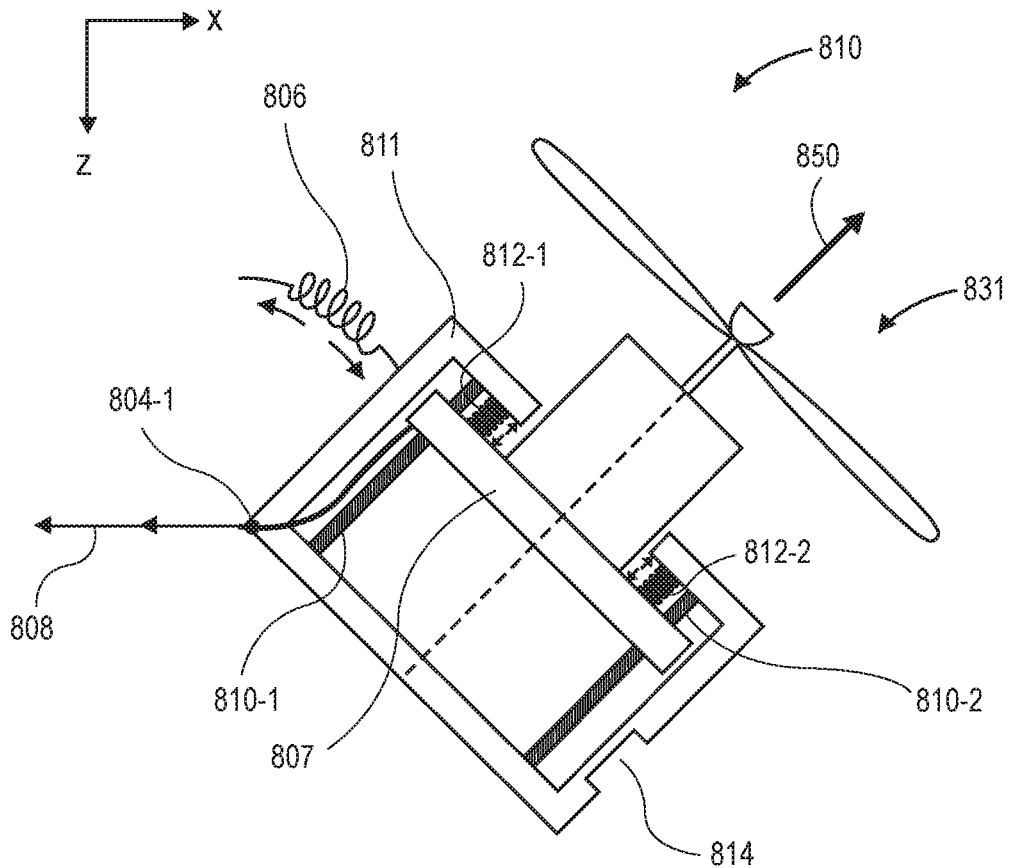
FIG. 8B illustrates the example loss of thrust detection mechanism of the example reconfigurable propulsion mechanism in a second position, in accordance with disclosed implementations.

In comparison, when a thrust is produced by the propulsion mechanism 831 that exceeds the first threshold, the baseplate 807 and coupled propulsion mechanism 831 move from position 1 803-1 (FIG. 8A) toward position 2 803-2 (FIG. 8B). To reach position 2 803-2, the thrust 850 produced by the propulsion mechanism must be greater than a second threshold, which is greater than the first threshold. Thrust forces produced between the first threshold and the second threshold result in the LTDM 810 being between position 1 803-1 and position 2 803-2. With such a configuration, the LTDM indicates a loss or lack of thrust when the baseplate is not in position 2 803-2 (i.e., the produced thrust is less than the second threshold), which may be indicated or provided via a connection 808.

Coupled to the baseplate 807 of the LTDM 810 is the connection 808 that may be used to indicate a loss of thrust by the propulsion mechanism 831 of the LTDM 810. In passive implementations that utilize a wire as the connection 808, the wire may pass through an opening in the hinge 804-1 and out of the LTDM. When the baseplate is in position 2, the baseplate holds the line taut, indicating that the propulsion mechanism 831 is producing thrust above the first threshold and second threshold. In comparison, when the baseplate 807 is in position 1, slack is introduced into the line, indicating a loss of thrust by the propulsion mechanism 831 coupled to the baseplate 807 of the LTDM 810.

While the above example describes the connection 808 as a wire, in other implementations other indicators or signals may be used to detect a loss of thrust by the propulsion mechanism 831. For example, a pressure sensor may be included on the bottom of the interior of the housing such that the pressure sensor is contacted by the baseplate 807 when the baseplate is in position 1, thereby indicating a loss of thrust by the propulsion mechanism. In another example, the pressure sensor may be included on a top of the interior of the housing such that when a contact between the pressure sensor and the baseplate is lost, the loss of thrust is detected. In still other examples, sensors may be included on one or more of the rails, energy storage mechanisms, etc., to detect movement of the baseplate 807 and corresponding thrust or lack of thrust.

Also included on the housing is a first part of the hinge 804-1 that pivotably couples the LTDM 810 to the RM of the reconfigurable propulsion mechanism so that the LTDM may move between the normal operating position and the reconfigured operating position. Likewise, the housing 811 includes a receiver 814 that is engaged by a latch of the RM (discussed below) to engage and hold the LTDM in the normal operating position or disengage the LTDM so that it may pivot about the hinge 804-1 and move between the normal operating position and the reconfigured operating position. Finally, as discussed above, an energy storage mechanism 806, such as a spring, may be coupled between the housing 811 of the LTDM 810 and the RM.

Referring now to FIG. 8B, when a thrust 850 is produced by the propulsion mechanism 831 that is larger than the first threshold, the propulsion mechanism 831 and baseplate move toward position 2 803-2 and, when the thrust produced by the propulsion mechanism 831 is larger than the second threshold, the propulsion mechanism 831 and baseplate 807 are in position 2 803-2, as illustrated.

Figure 9A:
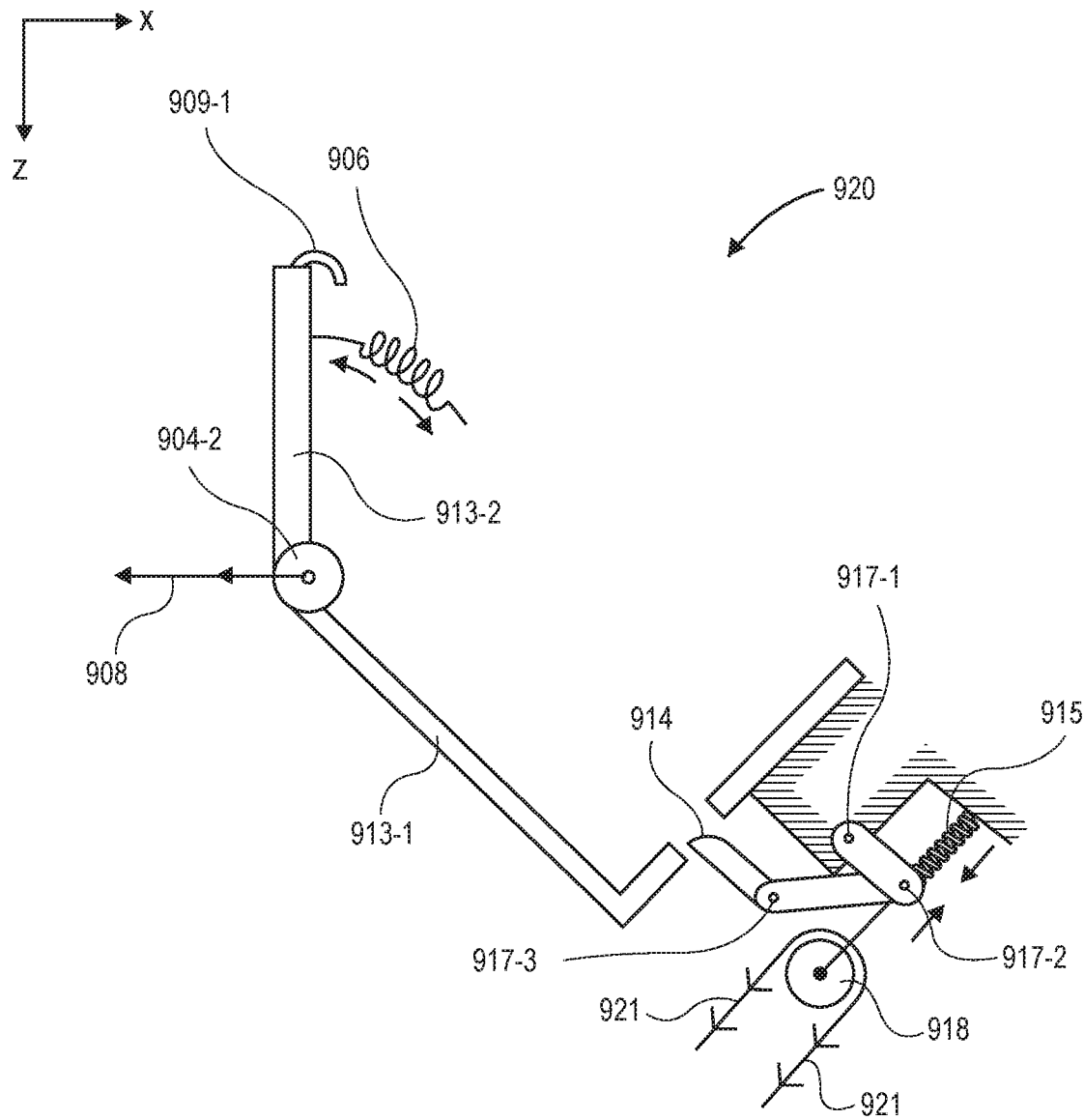
FIG. 9A illustrates an example release mechanism of an example reconfigurable propulsion mechanism in a disengaged position, in accordance with disclosed implementations.
Figure 9B:
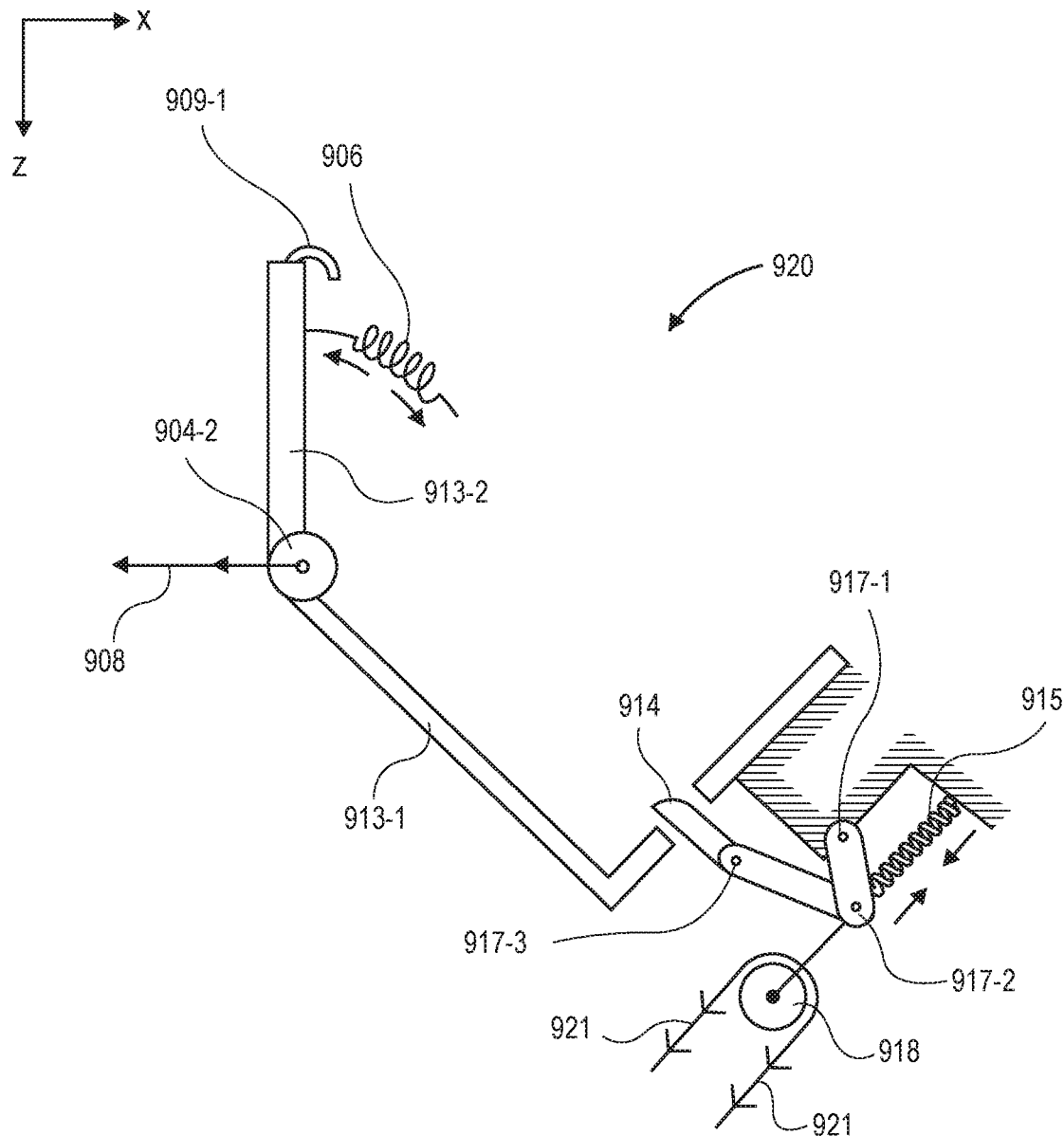
FIG. 9B illustrates the example release mechanism of the example reconfigurable propulsion mechanism in an engaged position, in accordance with disclosed implementations.

FIG. 9A illustrates an example RM 920 of an example reconfigurable propulsion mechanism in a disengaged position 901-1, in accordance with disclosed implementations. FIG. 9B illustrates the example RM 920 of the example reconfigurable propulsion mechanism in an engaged position 901-2, in accordance with disclosed implementations.

In the illustrated example, the RM 920 includes a frame 913 that includes a base portion 913-1 and a receiving portion 913-2. Both the base portion 913-1 and the receiving portion 913-2 may be fixed with respect to each other. The base portion 913-1 may be coupled to a frame of a multi-rotor aerial vehicle, such as the aerial vehicles discussed above with respect to FIGS. 1-5, thereby securing the reconfigurable propulsion mechanism to the aerial vehicle.

At the connection between the base portion 913-1 and the receiving portion 913-2 is a hinge 904-2 that engages the hinge 804-1 of the LTDM 810 (FIGS. 8A-8B) so that the LTDM can pivot or move between the normal operating position and the reconfigured operating position. Likewise, in implementations that include a connection 908 in the form of the wire, as illustrated, the connection 908 may pass through an opening in the hinge 904-2 and out of the RM 920.

Coupled to an end of the receiving portion 913-2, as discussed above, may be a one-way latch 909-1 that engages the LTDM when the LTDM moves to the reconfigured operating position and against the receiving portion 913-2. In some implementations, the on-way latch 909-1 is optional. In addition, the energy storage mechanism 906 may be coupled between the receiving portion 913-2 and the LTDM to provide a force, referred to herein as a third threshold, that holds the LTDM in the normal operating position until a thrust produced by the propulsion mechanism of the LTDM exceeds the third threshold and begins to rotate the LTDM from the normal operating position toward the reconfigured operating position, provided the latch 914 is disengaged from the LTDM. When the thrust produced by the propulsion mechanism exceeds a fourth threshold, the LTDM will be in the reconfigured position and latched by the one-way latch 909-1.

The RM 920 may also include a latch 914 that is movable between the disengaged position 901-1 and the engaged position 901-2. As discussed above, when the latch 914 is in the disengaged position 901-1, the LTDM 810 is able to move about the hinge 804-1/904-2 between the normal operating position 701-1 (FIG. 7A) and the reconfigured operating position 701-2 (FIG. 7B). When the latch is in the engaged position 901-2, as illustrated in FIG. 9B, the latch 914 extends through the frame 913 of the RM 920 and engages the LTDM, securing the LTDM in the normal operating position 701-1 (FIG. 7A).

In passive implementations, the latch 914 may include one or more pivots 917-1, 917-2, 917-3 that enable the latch to move between disengaged position 901-1 and the engaged position 901-2. For example, a first pivot 917-1 may be coupled to and pivot about a fixed point of the RM 920 and a second pivot 917-2 may be coupled to an energy storage mechanism 915 and connected to pulley 918 that guides a connection 921, such as a wire. As discussed above, the connection 921 may be connected to an LTDM of at least one other reconfigurable propulsion mechanism of a multi-rotor aerial vehicle and, when a thrust is produced by that at least one other reconfigurable propulsion mechanism that exceeds the second threshold, the LTDM of that other propulsion mechanism maintains the connection 921 taut. Likewise when the force applied to the connection 921 by the thrust produced by the at least one other reconfigurable propulsion mechanism of the multi-rotor aerial vehicle is greater than a force applied to the lever by the energy storage mechanism 915, which is between the second and the third threshold, the energy storage mechanism stores energy and the latch 914 is maintained in the engaged position. In comparison, when the force of the thrust from the at least one other reconfigurable propulsion mechanism does not exceed the second threshold, the energy storage mechanism 915 releases energy and moves the latch to the disengaged position 901-1, thereby releasing the LTDM of the reconfigurable propulsion mechanism.

As discussed herein, the first threshold is less than the second threshold, the second threshold is less than the third threshold, and the third threshold is less than the fourth threshold. Likewise, as discussed, the thresholds relate to forces.

While the above example illustrates a passive implementation in which the connection 908/921 is a wire, in other implementations, the connections 908/921 may be electrical, electro mechanical, direct, indirect, etc., as discussed herein. Likewise, the energy storage mechanism 915 may be any device or component that is operable to move the latch between the disengaged position 901-1 (FIG. 9A) and the engaged position 901-2 (FIG. 9B). For example, in other implementations, the energy storage device may be a servo motor, worm drive, etc.

In still other examples, the energy storage mechanism 906 may be a spring loaded worm gear that is operable to move the LTDM 810 from the normal operating position to the reconfigured operating position. In such an implementation, the worm gear may be pre-loaded and latched into place prior to operation of the aerial vehicle, holding the LTDM 810 in the normal operating position. Upon detection of a loss of thrust by another reconfigurable propulsion mechanism, the latch may be disengaged allowing the spring to release energy causing the worm gear to move the LTDM 810 from the normal operating position to the reconfigured operating position.

Figure 10A:
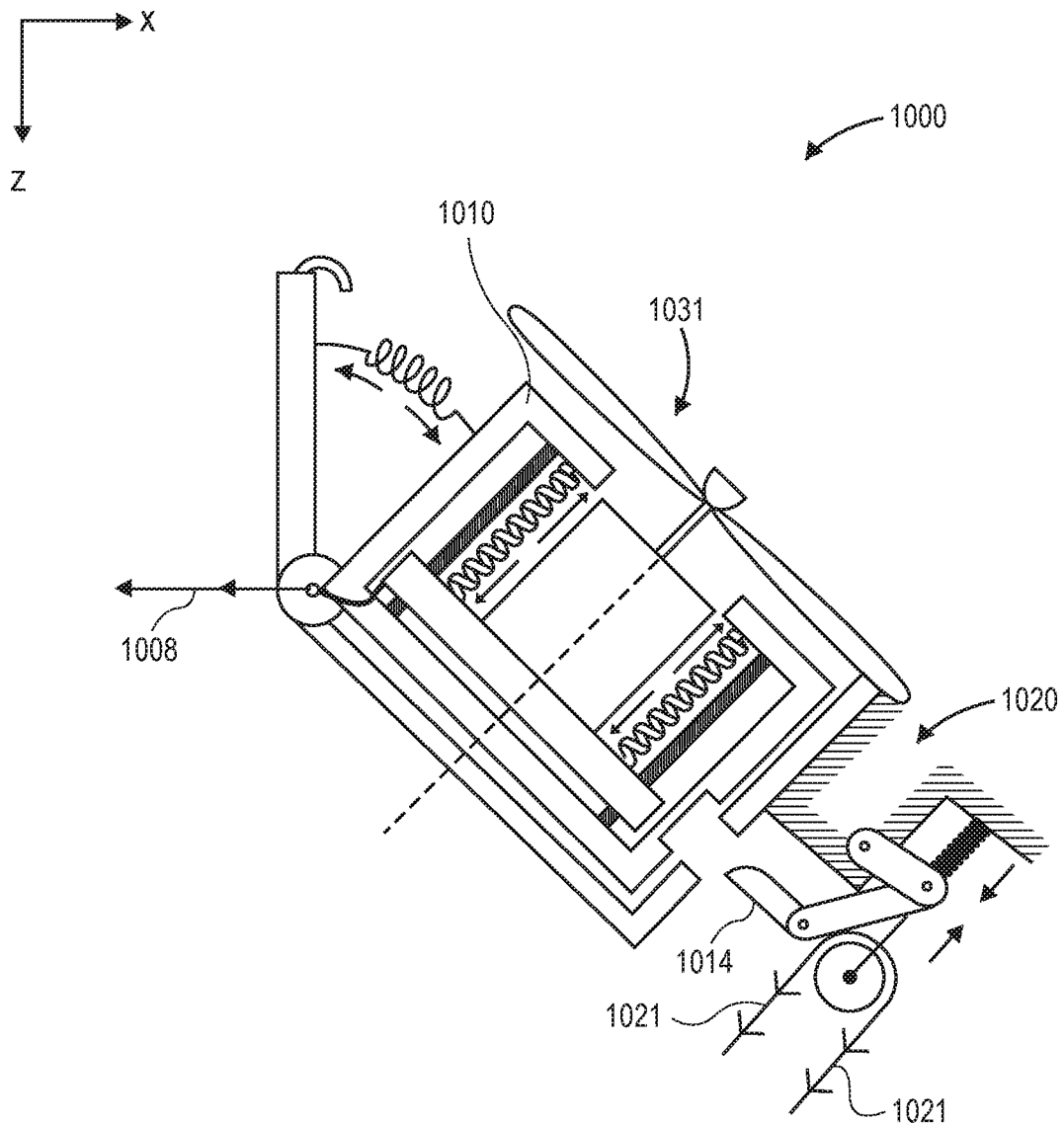
FIG. 10A illustrates an example reconfigurable propulsion mechanism in a vehicle startup position, in accordance with disclosed implementations.
Figure 10B:
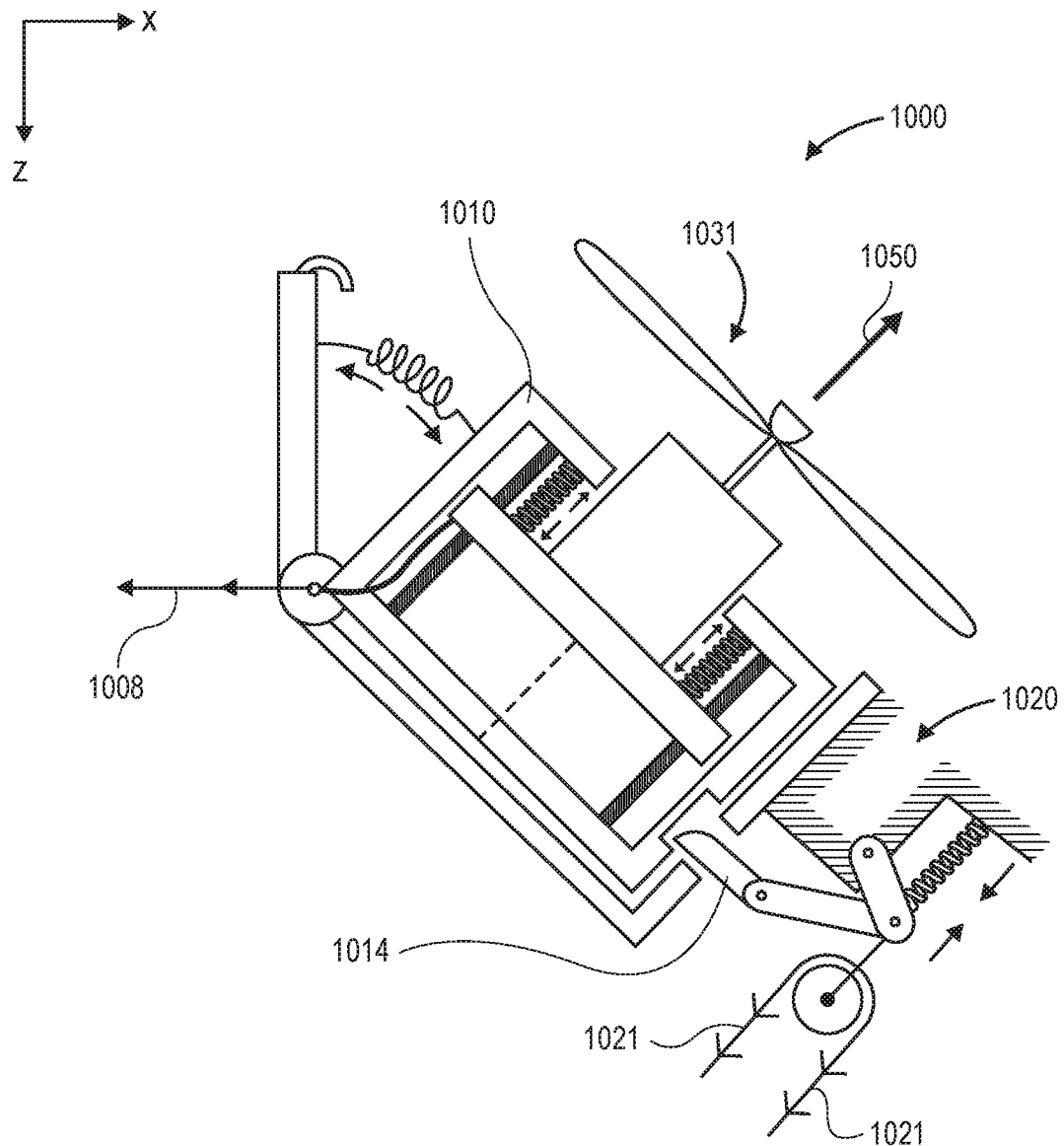
FIG. 10B illustrates the example reconfigurable propulsion mechanism in a normal operating position, in accordance with disclosed implementations.
Figure 10C:
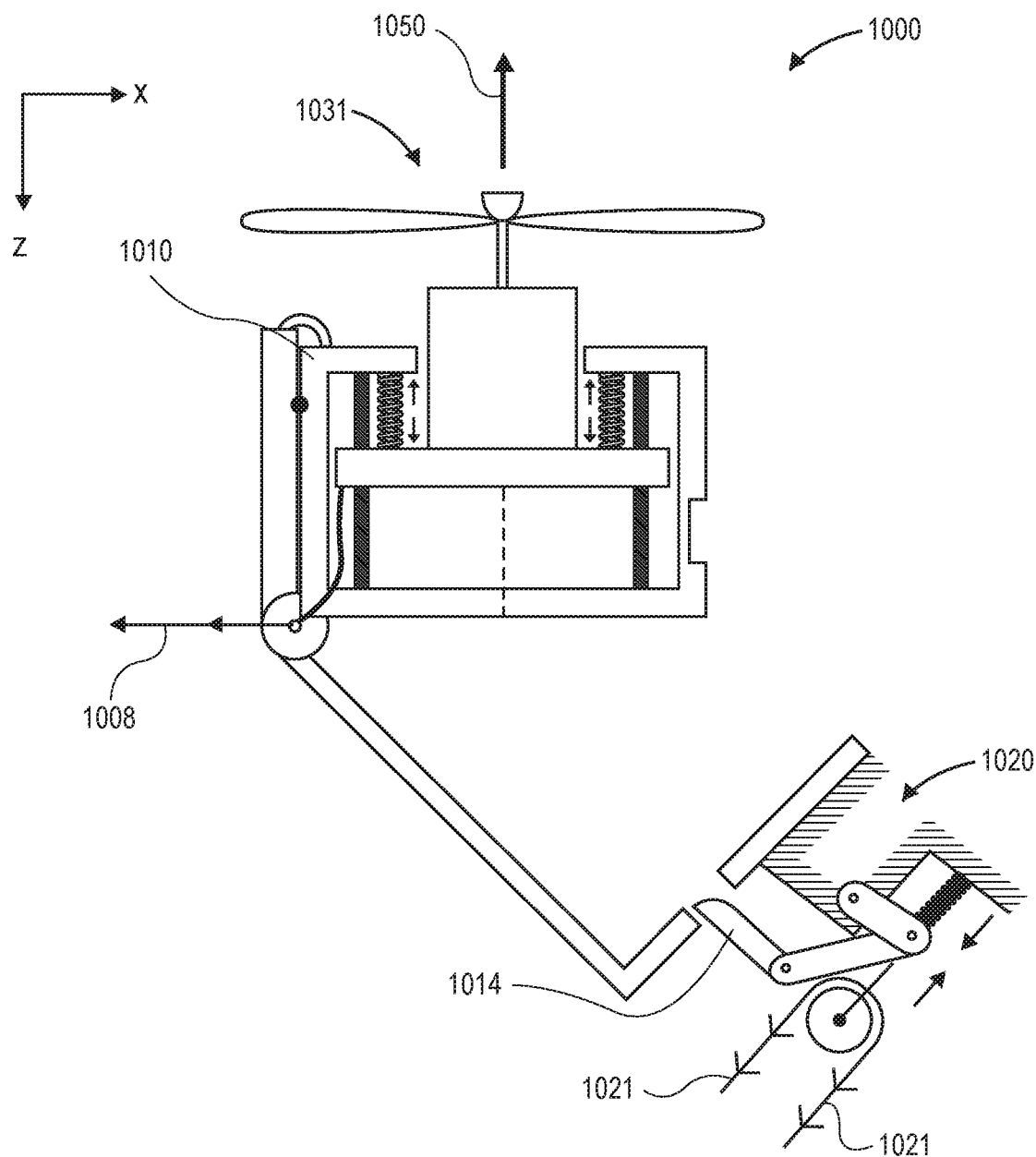
FIG. 10C illustrates the example reconfigurable propulsion mechanism in a reconfigured operating position, in accordance with disclosed implementations.

FIG. 10A illustrates an example reconfigurable propulsion mechanism 1000 in a startup position 1001-1, in accordance with disclosed implementations. FIG. 10B illustrates the example reconfigurable propulsion mechanism 1000 in a normal operating position 1001-2, in accordance with disclosed implementations. FIG. 10C illustrates the example reconfigurable propulsion mechanism 1000 in a reconfigured operating position 1001-3, in accordance with disclosed implementations. The example reconfigurable propulsion mechanism 1000 illustrated in FIGS. 10A through 10C include and correspond to the LTDM 810 discussed with respect to FIGS. 8A through 8B, labeled as 1010, and the RM 920 discussed with respect to FIGS. 9A through 9B, labeled as 1020.

Turning first to FIG. 10A, when an aerial vehicle is at rest, powered off, etc., no thrust is produced by any of the propulsion mechanisms 1031 and, as a result, the LTDMs of the propulsion mechanisms are each in position 1, as illustrated, indicating no thrust is being produced. Because the indication provided by an LTDM 1010 of one propulsion mechanism 1000 is used to control whether the latch 1014 of one or more other propulsion mechanisms is engaged or disengaged, when all propulsion mechanisms are off or idle (i.e., not producing thrust) the latch of each connected propulsion mechanism is disengaged.

To transition from an idle or off state without one or more of the propulsion mechanisms moving from the normal operating position to the reconfigured operating position, each of the propulsion mechanisms of a multi-rotor aerial vehicle may be commanded by a flight controller of the multi-rotor aerial vehicle to produce a thrust 1050 (FIG. 10B) that is greater than the second threshold but less than the third threshold. By producing a thrust that is greater than the second threshold but less than the third threshold, the connections 1008/1021 are made taut and the latches 1014 of the RM 1020 of each propulsion mechanism 1000 engages the LTDM 1010 holding the LTDM 1010 in the normal operating position. Once the thrust of each propulsion mechanism 1000 is above the second threshold but less than the third threshold, the reconfigurable propulsion mechanisms are in the normal operating positions, as illustrated in FIG. 10B.

Once each LTDM 1010 is engaged by the corresponding latch 1014 and each of the propulsion mechanisms are in the normal operating position 1001-2 (FIG. 10B), the aerial vehicle may continue as normal to aerially navigate and may produce forces above each of the thresholds and the reconfigurable propulsion mechanisms will remain in the normal operating positions. However, if a motor-out event occurs and a thrust produced by one of the reconfigurable propulsion mechanisms falls below the second threshold, slack will be introduced into the connection 1008 which will result in the latch 1014 of a connected reconfigurable propulsion mechanism disengaging. Provided the thrust produced by that connected reconfigurable propulsion mechanism is greater than the fourth threshold, the LTDM of that connected reconfigurable propulsion mechanism will transition from the normal operating position to the reconfigured operating position 1001-3, as illustrated in FIG. 10C.

Figure 11:
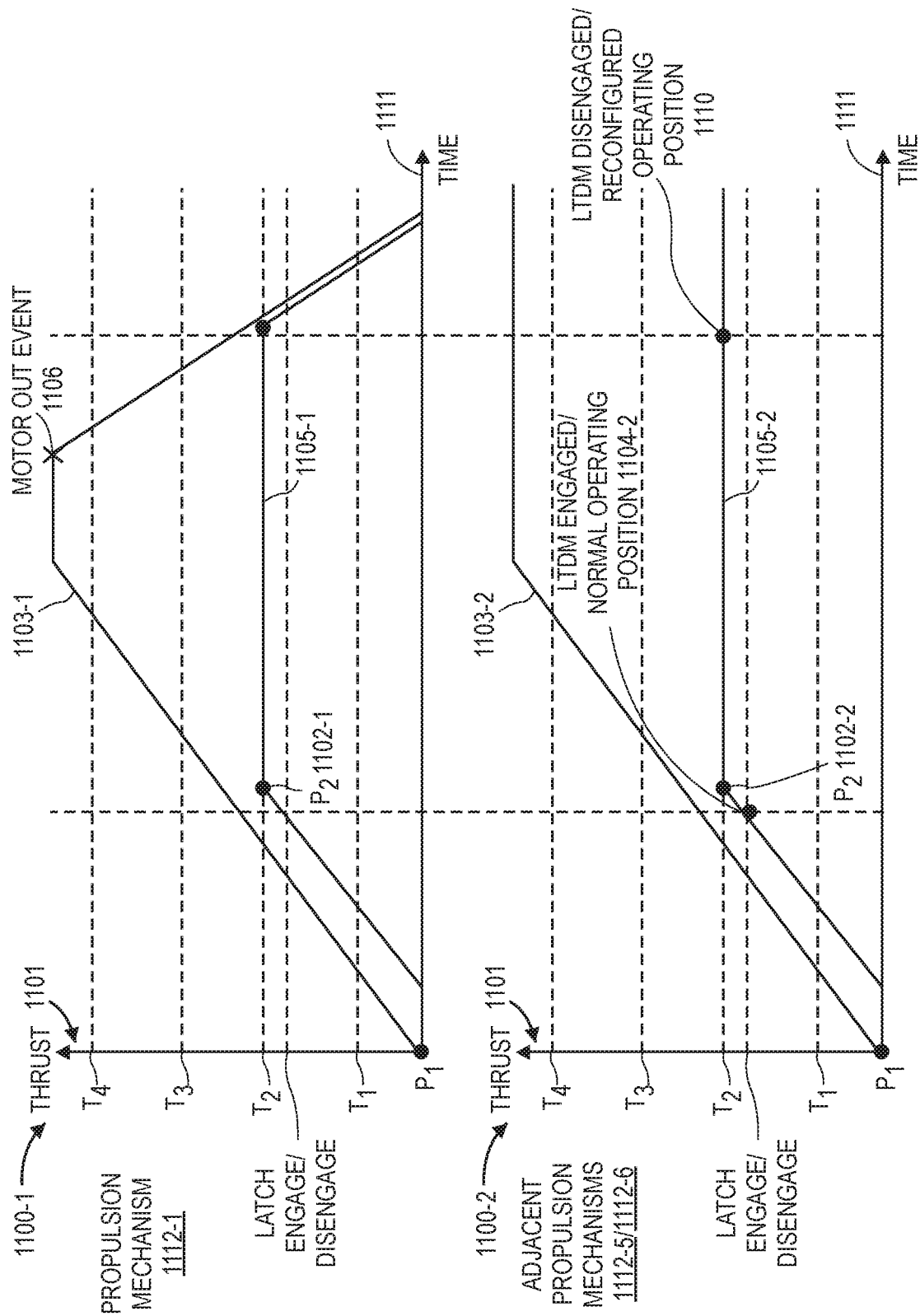
FIG. 11 are graphs illustrating the startup of an aerial vehicle with reconfigurable propulsion mechanisms and reconfiguration of propulsion mechanisms in response to a motor out event, in accordance with disclosed implementations.

FIG. 11 are graphs 1100-1/1100-2 illustrating the startup of an aerial vehicle with reconfigurable propulsion mechanisms 1112-1/1112-5/1112-6 and reconfiguration of propulsion mechanisms 1112-5/1112-6 in response to a motor out event by propulsion mechanism 1112-1, in accordance with disclosed implementations.

The x-axis 1111 of each graph 1100-1/1100-2 illustrates time and the y-axis 1101 of each graph illustrates thrust produced by the respective propulsion mechanisms 1112-1, 1112-5, 1112-6. Propulsion mechanisms 1112-1, 1112-5, 1112-6 correspond to propulsion mechanisms 1212-1, 1212-5, 1212-6 discussed further below with respect to FIGS. 12A through 12B.

Line 1103-1 illustrates thrust produced by propulsion mechanism 1112-1 over time 1111 and line 1103-2 illustrates thrust produced by propulsion mechanisms 1112-5, 1112-6 over time 1111. Line 1105-1 illustrates the position of the baseplate of the LTDM of propulsion mechanism 1112-1 over time and line 1105-2 illustrates the position of the baseplate of the LTDM of each of propulsion mechanisms 1112-5/1112-6 over time.

Prior to startup of an aerial vehicle, the propulsion mechanisms are not producing any force and the LTDM of each propulsion mechanism is in position 1 ($P_1$). At startup of the aerial vehicle, to ensure that all propulsion mechanisms are latched and remain in the normal operating position, as discussed above, all propulsion mechanisms are commanded to produce a thrust greater than the second threshold ($T_2$) but less than the third threshold ($T_3$). As discussed above, the second threshold ($T_2$) is a force that must be produced by the propulsion mechanism to overcome the force from energy storage mechanisms within the LTDM so that the baseplate of the LTDM will move from position 1 ($P_1$) to position 2 ($P_2$). The third threshold ($T_3$) is the force of the energy storage mechanism coupled between the receiving portion of the RM and the LTDM that must be overcome for the LTDM to begin moving from the normal operating position to the reconfigured operating position.

As the force produced from each of the propulsion mechanisms increases and exceeds the first threshold, the baseplate and propulsion mechanism begin to move from position 1 ($P_1$) to position 2 ($P_2$). As the thrust increases and the baseplate of each propulsion mechanism moves toward position 2 ($P_2$), the connection between the different propulsion mechanisms, in this example the connection between propulsion mechanism 1112-1 and each of 1112-5 and 1112-6 is pulled tight causing the latch of the connected RM to engage the LTDM of the connected propulsion mechanism. For example, as the thrust 1103-1 of propulsion mechanism 1112-1 increases the connection between the baseplate of the LTDM of propulsion mechanism 1112-1 and the RMs of propulsion mechanisms 1112-5/1112-6 is drawn tight and, at a point near the second threshold, the latch of propulsion mechanisms 1112-5/1112-6 are engaged, as illustrated by point 1104-2. When the latch engages the LTDM of each of propulsion mechanisms 1112-5/1112-6, the LTDMs are secured into the normal operating position, as discussed above. Likewise, the thrust from another propulsion mechanism of the aerial vehicle, not graphed in FIG. 11, will cause the latch of the RM of the propulsion mechanism 1112-1 to engage and secure the LTDM of propulsion mechanism 1112-1 in the normal operating position.

As the thrust passes the second threshold ($T_2$), the baseplate of each LTDM of the propulsion mechanisms is in position 2 ($P_2$), as illustrated by points 1102-1, 1102-2, and the LTDMs are engaged by the respective RM latches such that each reconfigurable propulsion mechanism remains in the normal operating position. Once each LTDM of the aerial vehicle is latched, the aerial vehicle is able to operate in a non-degraded manner with any thrust from any of the propulsion mechanisms, provided the thrust does not fall below the second threshold ($T_2$). For example, the thrusts 1103-1/1103-2 may exceed both the third threshold ($T_3$) and the fourth threshold ($T_4$) and the reconfigurable propulsion mechanisms 1112-1/1112-5/1112-6 will remain in the normal operating positions because they are latched.

Figure 12A:
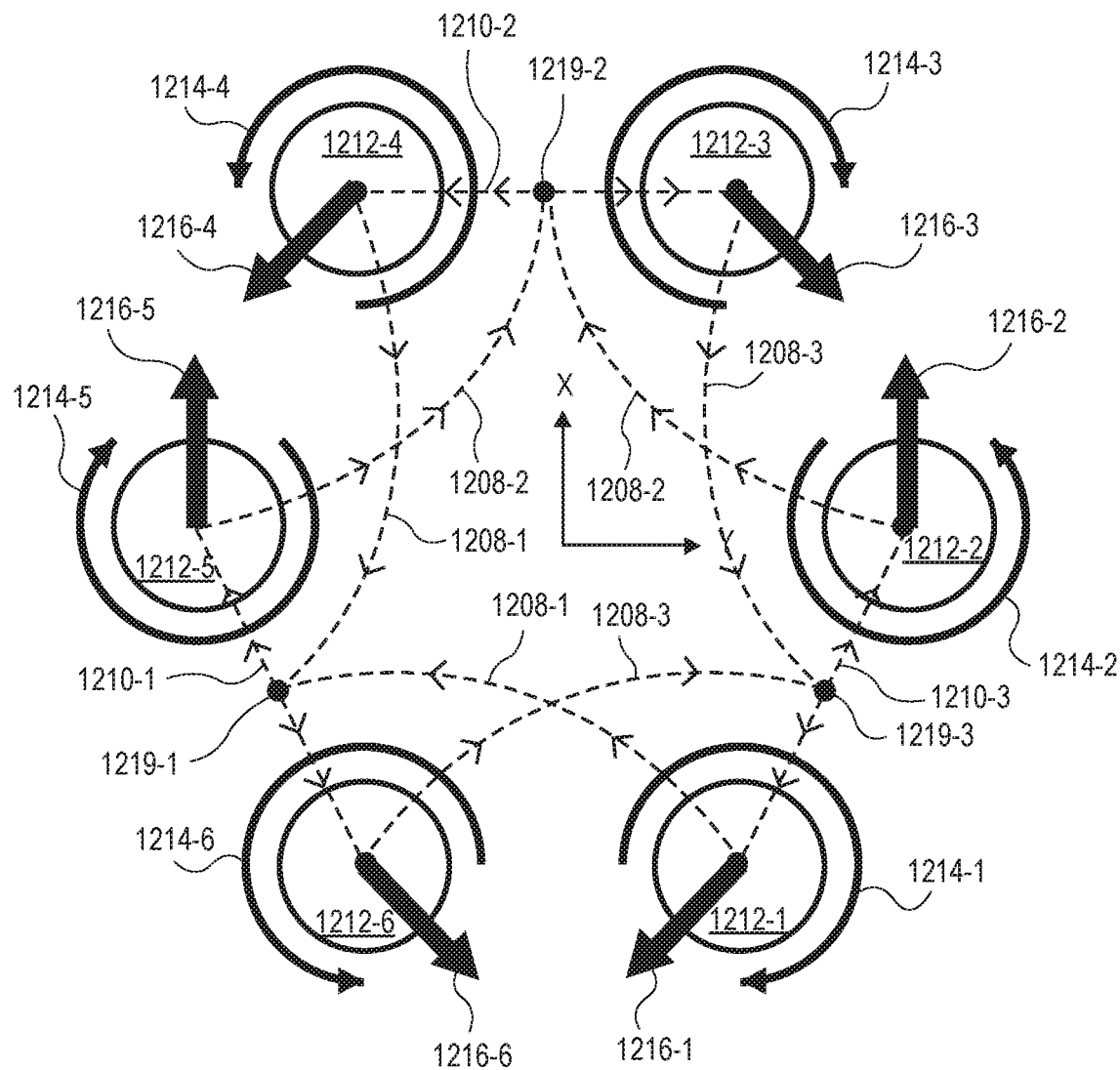
FIG. 12A illustrates forces and yaw torque polarities generated by propulsion mechanisms of a canted-hex aerial vehicle from an x-y coordinate perspective along with connections between example reconfigurable propulsion mechanisms, in accordance with disclosed implementations.
Figure 12B:
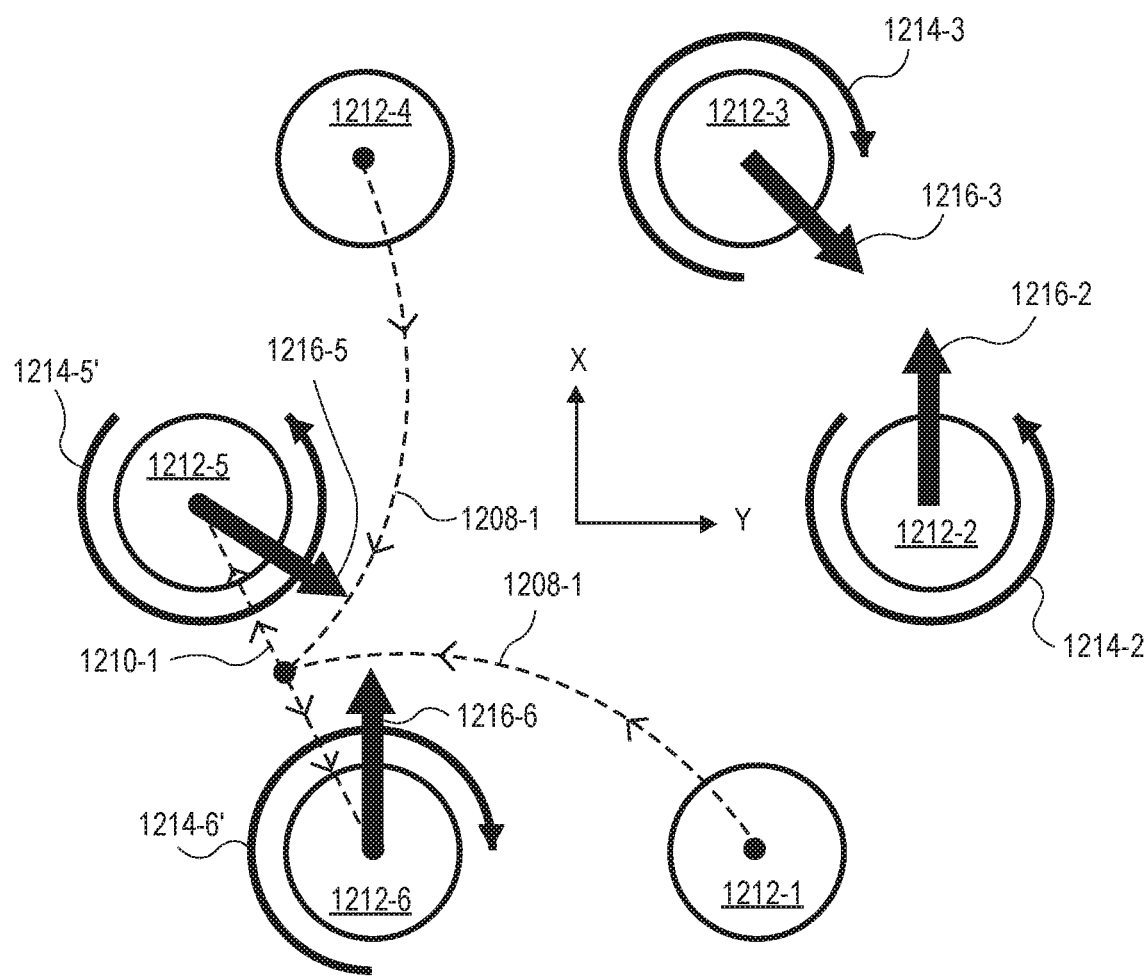
FIG. 12B illustrates forces and yaw torque polarities generated by propulsion mechanisms of a canted-hex aerial vehicle from an x-y coordinate perspective along with wiring connections between a portion of the example reconfigurable propulsion mechanisms when a first reconfigurable propulsion mechanism is not producing a first thrust, an opposing reconfigurable propulsion mechanism is shut down, and two adjacent reconfigurable propulsion mechanisms between the first propulsion mechanism and the opposing propulsion mechanism are reconfigured, in accordance with disclosed implementations.

However, if propulsion mechanism 1112-1 experiences a motor-out event 1106 and the thrust falls below the second threshold, as illustrated in graph 1100-1, as the baseplate of the LTDM of propulsion mechanism 1112-1 begins to move from position 2 ($P_2$) to position one ($P_1$), due to the loss of thrust, slack is introduced in the connection between propulsion mechanism 1112-1 and propulsion mechanisms 1112-5/1112-6. The slack introduced in the connection results in the latches of propulsion mechanisms 1112-5/1112-6 disengaging, as illustrated at point 1110. Upon disengagement of the latches of propulsion mechanisms 1112-5/1112-6, because both of those propulsion mechanisms are producing a thrust 1103-2 that is greater than the third threshold ($T_3$) and the fourth threshold ($T_4$) the LTDM of both propulsion mechanisms 1112-5/1112-6 moves from the normal operating position to the reconfigured operating position, thereby resulting in the yaw torque polarity produced by the thrust of each of those propulsion mechanism reversing so that the aerial vehicle continues to operate in a non-degraded manner. For example, as illustrated in FIGS. 12A through 12B and as discussed further below, in response to a motor-out event by propulsion mechanism 1212-1, the LTDM of propulsion mechanism 1212-5 moves from the normal operating position to the reconfigured operating position and the yaw torque polarity of the propulsion mechanism 1212-5 changes from a first direction (e.g., clockwise) to a second direction (e.g., counterclockwise). Likewise, in response to the motor-out event by propulsion mechanism 1212-1, the LTDM of propulsion mechanism 1212-6 moves from the normal operating position to the reconfigured operating position and the yaw torque polarity of the propulsion mechanism 1212-6 changes from the second direction (e.g., counterclockwise) to the first direction (e.g., clockwise). As discussed herein, the reversal of the yaw torque polarity of the propulsion mechanisms is accomplished without altering the spin direction of the propulsion mechanisms.

FIG. 12 illustrates forces and yaw torque polarities generated by propulsion mechanisms of a canted-hex aerial vehicle from an x-y coordinate perspective along with connections between example reconfigurable propulsion mechanisms, in accordance with disclosed implementations.

Similar to the discussion presented above with respect to FIGS. 1-6C, in the illustrated example, propulsion mechanism 1212-3 is canted toward propulsion mechanism 1212-2 and propulsion mechanism 1212-2 is canted toward propulsion mechanism 1212-3, thereby forming a pair of propulsion mechanisms in which the lateral forces 1216-3, 1216-2 produced by the pair of propulsion mechanisms 1212-3, 1212-2 substantially cancel each other out when similar forces are generated by the pair of propulsion mechanisms, leaving a thrust force in substantially the z direction. Likewise, in examples in which the propulsion mechanisms generate a yaw torque, such as yaw torques 1214-3, 1214-2, the pair may be arranged so that the yaw torque polarities of the pair of propulsion mechanisms cancel each other out when similar forces are generated.

Each propulsion mechanism may be paired with another propulsion mechanism. Continuing with FIG. 12, propulsion mechanism 1212-1 is canted toward propulsion mechanism 1212-6 and propulsion mechanism 1212-6 is canted toward propulsion mechanism 1212-1, thereby forming a second pair of propulsion mechanisms in which the lateral forces 1216-1, 1216-6 produced by the pair of propulsion mechanisms 1212-1, 1212-6 substantially cancel each other out when similar forces are generated by the pair of propulsion mechanisms, leaving a lifting force in substantially the z direction. Likewise, in examples in which the propulsion mechanisms generate a yaw torque, such as yaw torques 1214-1, 1214-6, the pair may be arranged so that the yaw torque polarities of the pair of propulsion mechanisms cancel each other out when similar forces are generated. Finally, in this example, propulsion mechanism 1212-5 is canted toward propulsion mechanism 1212-4 and propulsion mechanism 1212-4 is canted toward propulsion mechanism 1212-5, thereby forming a third pair of propulsion mechanisms in which the lateral forces 1216-5, 1216-4 produced by the pair of propulsion mechanisms 1212-5, 1212-4 substantially cancel each other out when similar forces are generated by the pair of propulsion mechanisms, leaving a lifting force in substantially the z direction. Likewise, in examples in which the propulsion mechanisms generate a yaw torque, such as yaw torques 1214-5, 1214-4, the pair may be arranged so that the yaw torque polarities of the pair of propulsion mechanisms cancel each other out when similar forces are generated.

In the illustrated example, the yaw torque polarities of the yaw torques 1214-1, 1214-2, 1214-3, 1214-4, 1214-5, 1214-6 of adjacent propulsion mechanisms 1212-1, 1212-2, 1212-3, 1212-4, 1212-5, 1212-6 are each in alternate polarities.

As discussed above, connections may exist between one or more of the reconfigurable propulsion mechanisms 1212-1 through 1212-6 such that when a loss of thrust is detected at one of the propulsion mechanisms the connection communicates the loss of thrust to the connected propulsion mechanisms thereby resulting in reconfiguration of the connected propulsion mechanism(s) from the normal operating position to the reconfigured operating position, as discussed herein.

Illustrated is one example for connecting reconfigurable propulsion mechanisms of a hex-rotor aerial vehicle. In the illustrated example, the connection 1208-1 from the LTDM of propulsion mechanism 1212-1 is connected to connections 1210-1 of the RM of propulsion mechanisms 1212-5 and 1212-6 at connection point 1219-1 such that, if a loss of thrust is detected for propulsion mechanism 1212-1, each of propulsion mechanisms 1212-5 and 1212-6 will reconfigure to the reconfigured operating positions. Likewise, the connection 1208-1 from the LTDM of propulsion mechanism 1212-4, which is opposite propulsion mechanism 1212-1, is also connected to connections 1210-1 of propulsion mechanisms 1212-5, 1212-6 at connection point 1219-1 such that if a loss of thrust is detected for propulsion mechanism 1212-4, each of propulsion mechanisms 1212-5 and 1212-6 will reconfigure to the reconfigured operating positions.

The connection 1208-2 from the LTDM of propulsion mechanism 1212-2 is connected to connections 1210-2 of the RM of propulsion mechanisms 1212-3 and 1212-4 at connection point 1219-2 such that, if a loss of thrust is detected for propulsion mechanism 1212-2, each of propulsion mechanisms 1212-3 and 1212-4 will reconfigure to the reconfigured operating positions. Likewise, the connection 1208-2 from the LTDM of propulsion mechanism 1212-5, which is opposite propulsion mechanism 1212-2, is also connected to connections 1210-2 of propulsion mechanisms 1212-3, 1212-4 at connection point 1219-2 such that, if a loss of thrust is detected for propulsion mechanism 1212-5, each of propulsion mechanisms 1212-3 and 1212-4 will reconfigure to the reconfigured operating positions.

The connection 1208-3 from the LTDM of propulsion mechanism 1212-3 is connected to connections 1210-3 of the RM of propulsion mechanisms 1212-1 and 1212-2 at connection point 1219-3 such that, if a loss of thrust is detected for propulsion mechanism 1212-3, each of propulsion mechanisms 1212-1 and 1212-2 will reconfigure to the reconfigured operating positions. Likewise, the connection 1208-3 from the LTDM of propulsion mechanism 1212-6, which is opposite propulsion mechanism 1212-3, is also connected to connections 1210-3 of propulsion mechanisms 1212-1, 1212-2 at connection point 1219-3 such that, if a loss of thrust is detected for propulsion mechanism 1212-6, each of propulsion mechanisms 1212-1 and 1212-2 will reconfigure to the reconfigured operating positions.

In a passive implementation, the connections 1208/1210 may be wire connections and the connection points 1219 may be pulleys or other forms of connections. Likewise, in some implementations, single wires may be used at the connection between the LTDM of opposing pairs of propulsion mechanisms. For example, connection 1208-1 may be a single wire between the LTDM of the first propulsion mechanism 1212-1 and the LTDM of the fourth propulsion mechanism 1212-4. The connection 1208-2 may be a single connection between the LTDM of the second propulsion mechanism 1212-2 and the LTDM of the fifth propulsion mechanism 1212-5. The connection 1208-3 may be a single connection between the LTDM of the third propulsion mechanism 1212-3 and the LTDM of the sixth propulsion mechanism 1212-6.

Similarly, a single connection may be used that connects that RM of adjacent propulsion mechanisms. For example, the connection 1210-1 may be a single connection between the RM of the fifth propulsion mechanism 1212-5 and the RM of the sixth propulsion mechanism 1212-6. The connection 1210-2 may be a single connection between the RM of the third propulsion mechanism 1212-3 and the RM of the fourth propulsion mechanism 1212-4. The connection 1210-3 may be a single connection between the RM of the first propulsion mechanism 1212-1 and the RM of the second propulsion mechanism 1212-2. Each of the connection points 1219-1, 1219-2, 1219-3 may be a pulley or another mechanism that will cause the transition of adjacent propulsion mechanisms when slack is introduced into the connection 1208 from the LTDM of either of the connected propulsion mechanisms.

For example, and referring to FIG. 12B, if a loss of thrust is experienced by either reconfigurable propulsion mechanisms 1212-1 or 1212-4, slack will be introduced into connection 1208-1/1210-1 which will cause the latch of both of the connected adjacent reconfigurable propulsion mechanisms 1212-5, 1212-6 to disengage and the LTDM of those propulsion mechanisms 1212-5, 1212-6 to move from the normal operating position to the reconfigured operating position so that the yaw torque polarity will reverse, as illustrated by yaw torque polarities 1214-5', 1214-6'. Likewise, a sensor on the connection 1208-1 may provide an indication to a flight controller of the aerial vehicle indicating the loss of thrust and the resulting reconfiguration. The flight controller may shut down or terminate operation of the propulsion mechanism 1212-1/1212-4 opposite the propulsion mechanism 1212-1/1212-4 that experienced the loss of thrust (motor-out of event) and alter flight control to operate as a canted quad-rotor aerial vehicle as illustrated in FIG. 12B.

Figure 13:
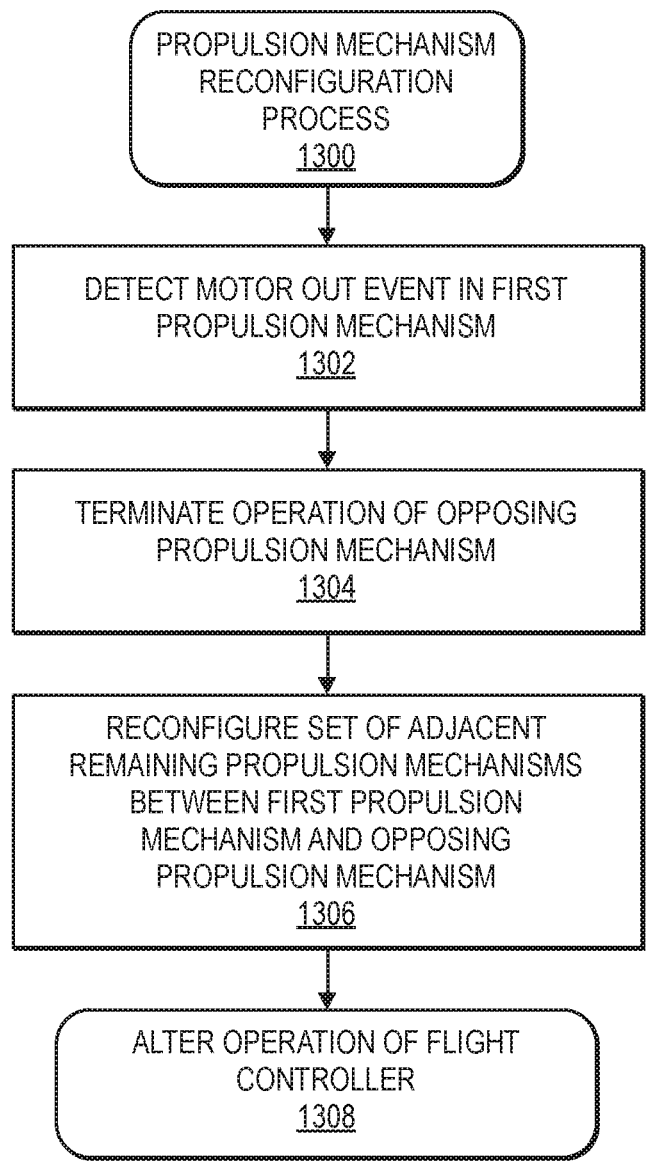
FIG. 13 is an example propulsion mechanism reconfiguration process, in accordance with disclosed implementations.

FIG. 13 is an example propulsion mechanism reconfiguration process 1300, in accordance with disclosed implementations. The example process may be performed during flight operations of a multi-rotor aerial vehicle, such as a canted-hex aerial vehicle, a canted-octo aerial vehicle, etc.

The example process 1300 begins upon detection of a motor-out event by a first propulsion mechanism of a plurality of propulsion mechanisms operating on the multi-rotor aerial vehicle, as in 1302. The motor-out event may be detected as a result of a loss of thrust from the first propulsion mechanism. As discussed above, a loss of thrust may be detected in a variety of manners from passive systems that use wires to more active systems that include sensors and/or other forms of thrust detection.

Upon detection of a loss of thrust by the first propulsion mechanism, the flight controller or propulsion mechanism controller of the aerial vehicle terminates operation of the propulsion mechanism that is opposite in position to the first propulsion mechanism, referred to herein as an opposing propulsion mechanism, as in 1304. In addition, one set of the remaining operational adjacent propulsion mechanisms between the first propulsion mechanism and the opposing propulsion mechanism are moved from the normal operating position to the reconfigured operating position, thereby reversing the yaw torque polarity of those adjacent propulsion mechanisms and restoring the alternating yaw torque polarities of the remaining operational propulsion mechanisms, as in 1306.

Finally, in some implementations, the flight controller may alter operation to operate as an aerial vehicle with two less propulsion mechanisms, as in 1308. For example, if the aerial vehicle was originally a canted-hex rotor aerial vehicle, the flight controller will alter operation to operate as a canted-quad rotor aerial vehicle. As another example, if the aerial vehicle was originally a canted-octo rotor aerial vehicle, that flight controller will alter operation to operate as a canted-hex rotor aerial vehicle.

Figure 14:
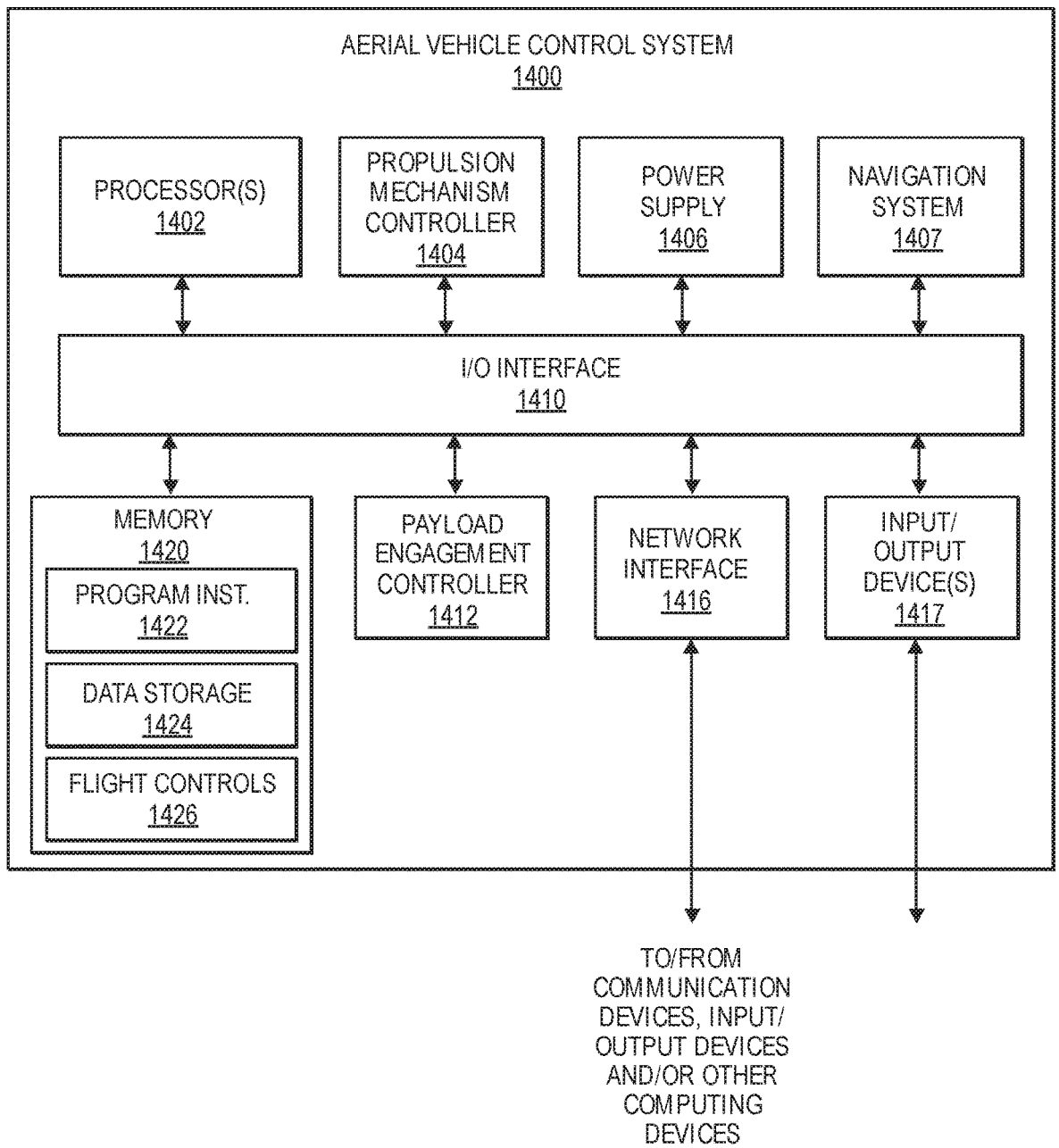
FIG. 14 is a block diagram illustrating various components of an example aerial vehicle control system, in accordance with disclosed implementations.

FIG. 14 is a block diagram illustrating various components of an example aerial vehicle control system 1400, in accordance with disclosed implementations.

In the illustrated implementation, the aerial vehicle control system 1400 includes one or more processors 1402, coupled to a memory, e.g., a non-transitory computer readable storage medium 1420, via an input/output (I/O) interface 1410. The aerial vehicle control system 1400 also includes propulsion mechanism controllers 1404, such as electronic speed controls (ESCs), power modules 1406 and/or a navigation system 1407. The aerial vehicle control system 1400 further includes a payload engagement controller 1412, a network interface 1416, and one or more input/output devices 1417.

In various implementations, the aerial vehicle control system 1400 may be a uniprocessor system including one processor 1402, or a multiprocessor system including several processors 1402 (e.g., two, four, eight, or another suitable number). The processor(s) 1402 may be any suitable processor capable of executing instructions. For example, in various implementations, the processor(s) 1402 may be general-purpose or embedded processors implementing any of a variety of instruction set architectures (ISAs), such as the x86, PowerPC, SPARC, or MIPS ISAs, or any other suitable ISA. In multiprocessor systems, each processor(s) 1402 may commonly, but not necessarily, implement the same ISA.

The non-transitory computer readable storage medium 1420 may be configured to store executable instructions, data, flight paths, flight control parameters, center of gravity information, and/or data items accessible by the processor(s) 1402. In various implementations, the non-transitory computer readable storage medium 1420 may be implemented using any suitable memory technology, such as static random-access memory (SRAM), synchronous dynamic RAM (SDRAM), nonvolatile/Flash-type memory, or any other type of memory. In the illustrated implementation, program instructions and data implementing desired functions, such as those described herein, are shown stored within the non-transitory computer readable storage medium 1420 as program instructions 1422, data storage 1424 and flight controls 1426, respectively. In other implementations, program instructions, data, and/or flight controls may be received, sent, or stored upon different types of computer-accessible media, such as non-transitory media, or on similar media separate from the non-transitory computer readable storage medium 1420 or the aerial vehicle control system 1400. Generally speaking, a non-transitory, computer readable storage medium may include storage media or memory media such as magnetic or optical media, e.g., disk or CD/DVD-ROM, coupled to the aerial vehicle control system 1400 via the I/O interface 1410. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via the network interface 1416.

In one implementation, the I/O interface 1410 may be configured to coordinate I/O traffic between the processor(s) 1402, the non-transitory computer readable storage medium 1420, and any peripheral devices, the network interface or other peripheral interfaces, such as input/output devices 1417. In some implementations, the I/O interface 1410 may perform any necessary protocol, timing or other data transformations to convert data signals from one component (e.g., non-transitory computer readable storage medium 1420) into a format suitable for use by another component (e.g., processor(s) 1402). In some implementations, the I/O interface 1410 may include support for devices attached through various types of peripheral buses, such as a variant of the Peripheral Component Interconnect (PCI) bus standard or the Universal Serial Bus (USB) standard, for example. In some implementations, the function of the I/O interface 1410 may be split into two or more separate components, such as a north bridge and a south bridge, for example. Also, in some implementations, some or all of the functionality of the I/O interface 1410, such as an interface to the non-transitory computer readable storage medium 1420, may be incorporated directly into the processor(s) 1402.

The propulsion mechanism controllers 1404 may communicate with the navigation system 1407 and adjust the rotational speed, position, orientation, or other parameters of each reconfigurable propulsion mechanism to stabilize the aerial vehicle, and/or to perform one or more maneuvers and guide the aerial vehicle along a flight path and/or to a safe landing location.

The navigation system 1407 may include a global positioning system (GPS), indoor positioning system (IPS), or other similar system and/or sensors that can be used to navigate the aerial vehicle to and/or from a location. The payload engagement controller 1412 communicates with the actuator(s) or motor(s) (e.g., a servo motor) used to engage and/or disengage items.

The network interface 1416 may be configured to allow data to be exchanged between the aerial vehicle control system 1400, other devices attached to a network, such as other computer systems (e.g., remote computing resources), and/or with aerial vehicle control systems of other aerial vehicles. For example, the network interface 1416 may enable wireless communication between the aerial vehicle and an aerial vehicle control system that is implemented on one or more remote computing resources. For wireless communication, an antenna of the aerial vehicle or other communication components may be utilized. As another example, the network interface 1416 may enable wireless communication between numerous aerial vehicles. In various implementations, the network interface 1416 may support communication via wireless general data networks, such as a Wi-Fi network. For example, the network interface 1416 may support communication via telecommunications networks, such as cellular communication networks, satellite networks, and the like.

Input/output devices 1417 may, in some implementations, include one or more displays, imaging devices, thermal sensors, infrared sensors, time of flight sensors, accelerometers, pressure sensors, weather sensors, etc. Multiple input/output devices 1417 may be present and controlled by the aerial vehicle control system 1400. One or more of these sensors may be utilized to detect failures or faults, control wingborn or VTOL flight, effect transitions between wingborn and VTOL configurations, identify safe landing locations, and/or any other operations or functions described herein.

As shown in FIG. 14, the memory may include program instructions 1422, which may be configured to implement the example routines and/or sub-routines described herein. The data storage 1424 may include various data stores for maintaining data items that may be provided for determining flight paths, landing, reconfiguration of one or more reconfigurable propulsion mechanisms, identifying locations for disengaging items, determining which propulsion mechanisms to utilize to execute a maneuver, etc. In various implementations, the parameter values and other data illustrated herein as being included in one or more data stores may be combined with other information not described or may be partitioned differently into more, fewer, or different data structures. In some implementations, data stores may be physically located in one memory or may be distributed among two or more memories.

Those skilled in the art will appreciate that the aerial vehicle control system 1400 is merely illustrative and is not intended to limit the scope of the present disclosure. In particular, the computing system and devices may include any combination of hardware or software that can perform the indicated functions. The aerial vehicle control system 1400 may also be connected to other devices that are not illustrated, or instead may operate as a stand-alone system. In addition, the functionality provided by the illustrated components may, in some implementations, be combined in fewer components or distributed in additional components. Similarly, in some implementations, the functionality of some of the illustrated components may not be provided and/or other additional functionality may be available.

Those skilled in the art will also appreciate that, while various items are illustrated as being stored in memory or storage while being used, these items or portions of them may be transferred between memory and other storage devices for purposes of memory management and data integrity. Alternatively, in other implementations, some or all of the software components may execute in memory on another device and communicate with the illustrated aerial vehicle control system 1400. Some or all of the system components or data structures may also be stored (e.g., as instructions or structured data) on a non-transitory, computer-accessible medium or a portable article to be read by an appropriate drive. In some implementations, instructions stored on a computer-accessible medium separate from the aerial vehicle control system 1400 may be transmitted to the aerial vehicle control system 1400 via transmission media or signals such as electrical, electromagnetic, or digital signals, conveyed via a communication medium such as a wireless link. Various implementations may further include receiving, sending, or storing instructions and/or data implemented in accordance with the foregoing description upon a computer-accessible medium. Accordingly, the techniques described herein may be practiced with other aerial vehicle control system configurations.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Moreover, with respect to the one or more methods or processes of the present disclosure described herein, including but not limited to the flow chart shown in FIG. 13, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale. Moreover, it should be apparent to one skilled in the art that the disclosure may be practiced without some or all of the specific details and steps disclosed herein.

While the above examples have been described with respect to aerial vehicles, the disclosed implementations may also be used for other forms of vehicles, including, but not limited to, ground based vehicles and water-based vehicles.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

It should be understood that, unless otherwise explicitly or implicitly indicated herein, any of the features, capacities, attributes, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementation as defined by the appended claims.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical. Furthermore, as used herein, "horizontal" flight refers to flight traveling in a direction substantially parallel to the ground (e.g., sea level), and that "vertical" flight refers to flight traveling substantially radially outward from or inward toward the earth's center. It should be understood by those having ordinary skill that trajectories may include components of both "horizontal" and "vertical" flight vectors.

Although the invention has been described and illustrated with respect to illustrative implementations thereof, the foregoing and various other additions and omissions may be made therein and thereto without departing from the spirit and scope of the present disclosure.

What is claimed is:

1. A reconfigurable propulsion mechanism apparatus, comprising:
   a loss of thrust detection mechanism ("LTDM"), including:
      a housing;
      at least one rail having a length and coupled to the housing;
      a baseplate within the housing and adjustable along at least a portion of the length of the rail between a first position and a second position; and
      a motor having a propeller, the motor coupled to the baseplate and movable between the first position and the second position, wherein:
         during operation of the motor, a thrust generated by the propeller of the motor moves the motor and the baseplate into the second position; and
         the motor and the baseplate are in the first position when the thrust is not generated by the propeller of the motor;
   a reconfiguration mechanism ("RM"), including:
      a hinge that couples the RM to the housing such that the LTDM may pivot about the hinge between a normal operating position and a reconfigured operating position; and
      a latch, movable between an engaged position and a disengaged position, wherein:
         when the latch is in the engaged position, the latch engages with the housing of the LTDM and maintains the LTDM in the normal operating position; and
         when the latch is in the disengaged position, the latch is disengaged from the housing of the LTDM and the LTDM is pivotable about the hinge from the normal operating position to the reconfigured operating position.

2. The reconfigurable propulsion mechanism apparatus of claim 1, further comprising:
   a connection that connects the latch of the RM with the baseplate of a second reconfigurable propulsion mechanism, wherein:
      the connection holds the latch in the engaged position in response to a second thrust produced by the second reconfigurable propulsion mechanism; and
      the connection allows the latch to move to the disengaged position when second thrust is not produced by the second reconfigurable propulsion mechanism.

3. The reconfigurable propulsion mechanism apparatus of claim 1, further comprising:
   a spring coupled between the housing and the baseplate, wherein the spring requires a thrust from the propeller of the motor to move the baseplate and the motor from the first position to the second position.

4. The reconfigurable propulsion mechanism apparatus of claim 1, further comprising:
   a spring coupled between the RM and the housing of the LTDM, wherein the spring requires a thrust from the propeller of the motor to move the LTDM from the normal operating position to the reconfigured operating position.

5. A multi-rotor aerial vehicle apparatus, comprising:
   a frame;
   a first reconfigurable propulsion mechanism coupled to the frame at a first position, wherein the first reconfigurable propulsion mechanism includes a first latch and is operable to at least:
      produce a first yaw torque with a first polarity when the first reconfigurable propulsion mechanism is engaged by the first latch and is in a normal operating position; and
      produce the first yaw torque with a second polarity that is opposite the first polarity when the first reconfigurable propulsion mechanism is disengaged by the first latch and in a reconfigured operating position;

a second reconfigurable propulsion mechanism coupled to the frame at a second position, wherein the second reconfigurable propulsion mechanism includes a second latch and is operable to at least:
  produce a second yaw torque with the second polarity when the second reconfigurable propulsion mechanism is engaged by the first latch and in the normal operating position; and
  produce the second yaw torque with the first polarity when the second reconfigurable propulsion mechanism is disengaged by the second latch and in the reconfigured operating position;

a third reconfigurable propulsion mechanism coupled to the frame at a third position, wherein the third reconfigurable propulsion mechanism includes a third latch and is operable to at least:
  produce a third yaw torque with the first polarity when the third reconfigurable propulsion mechanism is engaged by the third latch and in the normal operating position; and
  produce the third yaw torque with the second polarity when the third reconfigurable propulsion mechanism is disengaged by the third latch and in the reconfigured operating position;

a fourth reconfigurable propulsion mechanism coupled to the frame at a fourth position, wherein the fourth reconfigurable propulsion mechanism includes a fourth latch and is operable to at least:
  produce a fourth yaw torque with the second polarity when the fourth reconfigurable propulsion mechanism is engaged by the fourth latch and in the normal operating position; and
  produce the fourth yaw torque with the first polarity when the fourth reconfigurable propulsion mechanism is disengaged by the fourth latch and in the reconfigured operating position;

a fifth reconfigurable propulsion mechanism coupled to the frame at a fifth position, wherein the fifth reconfigurable propulsion mechanism includes a fifth latch and is operable to at least:
  produce a fifth yaw torque with the first polarity when the fifth reconfigurable propulsion mechanism is engaged by the fifth latch and in the normal operating position; and
  produce the fifth yaw torque with the second polarity when the fifth reconfigurable propulsion mechanism is disengaged by the fifth latch and in the reconfigured operating position;

a sixth reconfigurable propulsion mechanism coupled to the frame at a sixth position, wherein the sixth reconfigurable propulsion mechanism includes a sixth latch and is operable to at least:
  produce a sixth yaw torque with the second polarity when the sixth reconfigurable propulsion mechanism is engaged by the sixth latch and in the normal operating position; and
  produce the sixth yaw torque with the first polarity when the sixth reconfigurable propulsion mechanism is disengaged by the sixth latch and in the reconfigured operating position;

a first connection between the first reconfigurable propulsion mechanism, the second reconfigurable propulsion mechanism, and the third reconfigurable propulsion mechanism, wherein:

when a first thrust is produced by the first reconfigurable propulsion mechanism that exceeds a first threshold:
  the second latch engages the second reconfigurable propulsion mechanism and maintains the second reconfigurable propulsion mechanism in the normal operating position; and
  the third latch engages the third reconfigurable propulsion mechanism and maintains the third reconfigurable propulsion mechanism in the normal operating position;

when the first thrust does not exceed the first threshold, the first connection causes the second latch to disengage the second reconfigurable propulsion mechanism and the third latch to disengage the third reconfigurable propulsion mechanism;

when the second latch is disengaged from the second reconfigurable propulsion mechanism and a second thrust is produced by the second reconfigurable propulsion mechanism that exceeds a second threshold, the second reconfigurable propulsion mechanism moves from the normal operating position to the reconfigured operating position, thereby altering the polarity of the second yaw torque from the second polarity to the first polarity; and when the third latch is disengaged from the third reconfigurable propulsion mechanism and a third thrust is produced by the third reconfigurable propulsion mechanism that exceeds the second threshold, the third reconfigurable propulsion mechanism moves from the normal operating position to the reconfigured operating position, thereby altering the polarity of the third yaw torque from the first polarity to the second polarity.

6. The multi-rotor aerial vehicle apparatus of claim 5, further comprising:
  a hinge that allows the first reconfigurable propulsion mechanism to rotate between the normal operating position and the reconfigured operating position.

7. The multi-rotor aerial vehicle apparatus of claim 5, wherein the first reconfigurable propulsion mechanism further includes:
  a loss of thrust detection mechanism ("LTDM"), including:
    a housing to contain at least a portion of a propulsion mechanism that produces the first yaw torque; and
    a baseplate movable within the housing between a first position and a second position, wherein the propulsion mechanism is coupled to the baseplate and moves with the baseplate.

8. The multi-rotor aerial vehicle apparatus of claim 7, wherein the LTDM further includes:
  an energy storage device connected between the housing and the baseplate, wherein the energy storage device requires a force to move the baseplate from the first position to the second position.

9. The multi-rotor aerial vehicle apparatus of claim 5, further comprising:
  a one-way latch operable to engage the second reconfigurable propulsion mechanism when the second reconfigurable propulsion mechanism moves from the normal operating position to the reconfigured operating position.

10. The multi-rotor aerial vehicle apparatus of claim 5, further comprising:
  a flight controller operable to terminate an operation of the fourth reconfigurable propulsion mechanism in response to a loss of the first thrust of the first reconfigurable propulsion mechanism.

11. The multi-rotor aerial vehicle apparatus of claim 5, wherein the second reconfigurable propulsion mechanism further includes:
- a loss of thrust detection mechanism ("LTDM") that houses a motor of the second reconfigurable propulsion mechanism; and
- a release mechanism ("RM") that engages the LTDM such that the LTDM can move between the normal operating position and the reconfigured operating position, wherein the release mechanism is affixed to the frame and includes the second latch.

12. The multi-rotor aerial vehicle apparatus of claim 11, wherein the second reconfigurable propulsion mechanism further includes:
- an energy storage device coupled between the LTDM and the RM, wherein the energy storage device requires a force to move the LTDM from the normal operating position to the reconfigured operating position.

13. The multi-rotor aerial vehicle apparatus of claim 5, wherein the first connection includes a mechanical connection between a loss of thrust detection mechanism of the first reconfigurable propulsion mechanism, the second latch of the second reconfigurable propulsion mechanism, and the third latch of the third reconfigurable propulsion mechanism.

14. A method to reconfigure a multi-rotor aerial vehicle in response to a loss of thrust from a first propulsion mechanism of the multi-rotor aerial vehicle, comprising:
- producing a first thrust and a first yaw torque with a first polarity with the first propulsion mechanism of the multi-rotor aerial vehicle;
- producing a second thrust and a second yaw torque with a second polarity that is opposite the first polarity with a second propulsion mechanism of the multi-rotor aerial vehicle;
- producing a third thrust and a third yaw torque with the first polarity with a third propulsion mechanism of the multi-rotor aerial vehicle;
- producing a fourth thrust and a fourth yaw torque with the second polarity with a fourth propulsion mechanism of the multi-rotor aerial vehicle;
- producing a fifth thrust and a fifth yaw torque with the first polarity with a fifth propulsion mechanism of the multi-rotor aerial vehicle;
- producing a sixth thrust and a sixth yaw torque with the second polarity with a sixth propulsion mechanism of the multi-rotor aerial vehicle;
- in response to a loss of thrust by the first propulsion mechanism:
  - causing the second propulsion mechanism to reconfigure from a normal operating position to a reconfigured operating position such that the second propulsion mechanism produces the second yaw torque with the first polarity; and
  - causing the third propulsion mechanism to reconfigure from the normal operating position to the reconfigured operating position such that the third propulsion mechanism produces the third yaw torque with the second polarity.

15. The method of claim 14, further comprising:
- in response to a loss of thrust by the first propulsion mechanism, terminating an operation of the fourth propulsion mechanism that is opposite the first propulsion mechanism such that the fourth propulsion mechanism does not produce the fourth thrust or the fourth yaw torque.

16. The method of claim 14, further comprising:
- in response to a loss of thrust by the first propulsion mechanism, causing a latch that engages the second propulsion mechanism to move from an engaged position to a disengaged position such that the second propulsion mechanism can move from the normal operating position to the reconfigured operating position.

17. The method of claim 14, further comprising:
- engaging, with a one-way latch, the second propulsion mechanism when the second propulsion mechanism moves to the reconfigured operating position.

18. The method of claim 14, further comprising:
- in response to the loss of thrust by the first propulsion mechanism, reconfiguring an operation of a flight controller of the multi-rotor aerial vehicle.

19. The method of claim 14, wherein the second propulsion mechanism is canted at a first angle when in the normal operating position and canted at a second angle that is different than the first angle when in the reconfigured operating position.

20. The method of claim 14, further comprising:
- detecting the loss of the first thrust in response to the first propulsion mechanism moving from a second position within a housing toward a first position within the housing.

* * * * *